(12) United States Patent
Gossweiler et al.

(10) Patent No.: US 8,782,698 B2
(45) Date of Patent: Jul. 15, 2014

(54) CUSTOMIZABLE MEDIA CHANNELS

(75) Inventors: Richard C. Gossweiler, Sunnyvale, CA (US); Mehran Sahami, Palo Alto, CA (US); Manish G. Patel, Mountain View, CA (US); John Blackburn, Newcastle, WA (US); David A. Brown, Mountain View, CA (US); Neha Gupta, San Jose, CA (US); Thomas H. Taylor, Redmond, WA (US)

(73) Assignee: Google Inc., Mountain View, CA (US)

( * ) Notice: Subject to any disclaimer, the term of this patent is extended or adjusted under 35 U.S.C. 154(b) by 751 days.

(21) Appl. No.: 11/742,495

(22) Filed: Apr. 30, 2007

(65) Prior Publication Data
US 2008/0271080 A1  Oct. 30, 2008

(51) Int. Cl.
*H04N 5/445* (2011.01)
(52) U.S. Cl.
USPC .............. 725/39; 725/50; 725/53; 725/59
(58) Field of Classification Search
USPC ............ 725/34–36, 39, 42, 44, 46, 53, 58
See application file for complete search history.

(56) References Cited

U.S. PATENT DOCUMENTS

| | | |
|---|---|---|
| 4,963,995 A | 10/1990 | Lang |
| 5,010,499 A | 4/1991 | Yee |
| 5,121,476 A | 6/1992 | Yee |
| 5,589,892 A | 12/1996 | Knee et al. |
| 5,592,551 A | 1/1997 | Lett |
| 5,793,438 A | 8/1998 | Bedard |
| 5,805,235 A | 9/1998 | Bedard |
| 5,808,694 A | 9/1998 | Usui et al. |
| 5,903,816 A | 5/1999 | Broadwin et al. |
| 5,940,073 A | 8/1999 | Klosterman et al. |
| 6,002,394 A | 12/1999 | Schein et al. |
| 6,005,562 A | 12/1999 | Shiga et al. |
| 6,005,565 A | 12/1999 | Legall et al. |
| 6,014,184 A | 1/2000 | Knee et al. |
| 6,025,837 A | 2/2000 | Matthews et al. |
| 6,147,715 A | 11/2000 | Yuen et al. |
| 6,233,389 B1 | 5/2001 | Barton et al. |
| 6,263,501 B1 | 7/2001 | Schein et al. |
| 6,483,548 B1 | 11/2002 | Allport |
| 6,493,878 B1 | 12/2002 | Kassatly |

(Continued)

FOREIGN PATENT DOCUMENTS

| | | |
|---|---|---|
| EP | 0 594 350 | 4/1994 |
| EP | 0 620 689 | 10/1994 |

(Continued)

OTHER PUBLICATIONS

International Search Report & Written Opinion, PCT/US2008/062058, mailed Sep. 25, 2008, 10 pages.

(Continued)

*Primary Examiner* — Brian T Pendleton
*Assistant Examiner* — Dika C. Okeke
(74) *Attorney, Agent, or Firm* — Fish & Richardson P.C.

(57) ABSTRACT

A computer-implemented method includes receiving an identification of a media program from a broadcast channel on an electronic program guide for inclusion in a personalized channel, adding the identified program to a personalized channel at a first time, and adding one or more additional programs to the personalized channel at times other than the first time.

14 Claims, 13 Drawing Sheets

(56) References Cited

U.S. PATENT DOCUMENTS

| | | |
|---|---|---|
| 6,601,237 B1 * | 7/2003 | Ten Kate et al. ............... 725/58 |
| 6,640,337 B1 | 10/2003 | Lu |
| 6,698,020 B1 * | 2/2004 | Zigmond et al. ............... 725/34 |
| 6,721,955 B2 | 4/2004 | Khoo |
| 6,742,184 B1 * | 5/2004 | Finseth et al. ............... 725/53 |
| 6,769,128 B1 | 7/2004 | Knee et al. |
| 6,772,147 B2 * | 8/2004 | Wang ............... 725/56 |
| 6,774,926 B1 * | 8/2004 | Ellis et al. ............... 725/133 |
| 7,103,905 B2 * | 9/2006 | Novak ............... 725/47 |
| 7,328,450 B2 | 2/2008 | Macrae et al. |
| 7,398,542 B2 * | 7/2008 | Yamamura et al. ............... 725/58 |
| 7,493,015 B1 | 2/2009 | Van Stam et al. |
| 7,627,882 B2 | 12/2009 | Finseth et al. |
| 7,685,619 B1 | 3/2010 | Herz |
| 7,734,680 B1 * | 6/2010 | Kurapati et al. ............... 725/46 |
| 2002/0049620 A1 * | 4/2002 | Uchida et al. ............... 705/5 |
| 2002/0067909 A1 * | 6/2002 | Iivonen ............... 386/88 |
| 2002/0073425 A1 * | 6/2002 | Arai et al. ............... 725/44 |
| 2003/0086694 A1 * | 5/2003 | Davidsson ............... 725/58 |
| 2004/0078816 A1 * | 4/2004 | Johnson ............... 725/46 |
| 2004/0123318 A1 | 6/2004 | Lee |
| 2004/0210932 A1 | 10/2004 | Mori et al. |
| 2004/0268403 A1 | 12/2004 | Krieger et al. |
| 2005/0047752 A1 * | 3/2005 | Wood et al. ............... 725/58 |
| 2005/0060746 A1 * | 3/2005 | Kim ............... 725/46 |
| 2005/0160456 A1 * | 7/2005 | Moskowitz ............... 725/38 |
| 2006/0020973 A1 * | 1/2006 | Hannum et al. ............... 725/46 |
| 2006/0123455 A1 * | 6/2006 | Pai et al. ............... 725/46 |
| 2006/0130098 A1 * | 6/2006 | Rao et al. ............... 725/53 |
| 2007/0199019 A1 * | 8/2007 | Angiolillo et al. ............... 725/39 |
| 2008/0270449 A1 | 10/2008 | Gossweiler et al. |
| 2008/0270886 A1 | 10/2008 | Gossweiler et al. |
| 2008/0271078 A1 | 10/2008 | Gossweiler et al. |
| 2009/0055385 A1 | 2/2009 | Jeon |
| 2010/0031193 A1 * | 2/2010 | Stark et al. ............... 715/810 |
| 2011/0013885 A1 * | 1/2011 | Wong et al. ............... 725/51 |
| 2012/0110621 A1 | 5/2012 | Gossweiler |
| 2012/0151530 A1 * | 6/2012 | Krieger et al. ............... 725/51 |

FOREIGN PATENT DOCUMENTS

| | | |
|---|---|---|
| JP | 11308539 | 11/1999 |
| JP | 11338872 | 12/1999 |
| JP | 2003-189218 | 7/2003 |
| KR | 10-0703279 | 3/2007 |
| WO | WO00/40027 | 7/2000 |
| WO | WO02/103470 | 12/2002 |

OTHER PUBLICATIONS

International Preliminary Report on Patentability, International Application No. PCT/US2008/062058, dated Nov. 12, 2009 (6 pages).

U.S. Appl. No. 12/938,725, filed Nov. 3, 2010, Gossweiler.

U.S. Appl. No. 12/938,834, filed Nov. 3, 2010, Gossweiler et al.

European Search Report in European Application No. 08747213, dated Nov. 15, 2012, 3 pages.

Japanese Office Action in Japanese Application No. 2010-506611, dated Dec. 4, 2012, 6 pages.

\* cited by examiner

Results 1 - 10 of 123 for "lost" in the next two weeks

Lost
Wed 13 Mar 10:00pm HISTP 450  The Monkey Suit
Thu 14 Mar 10:00pm HISTP 450  Treehouse of Horror
Fri 15 Mar 10:00pm HISTP 450  The City of New York v ...
6 more »

Lost in Space
Tue 12 Mar 9:00am FOX 12  Monster Attacks Zach
Tue 19 Mar 9:00am FOX 12  Danger! Danger!
Tue 26 Mar 9:00am FOX 12  Mission Blast-Off
12 more »

Lost in the Annals of Time for the Very Long Titles of ...
Wed 13 Mar 8:00pm DISC 43  Where is Waldo?
Thu 14 Mar 8:00pm DISC 43  Finding Mr. GoodBar
Fri 15 Mar 8:00pm DISC 43  When Cities Collide
14 more »

Lost and Found
Sun 17 Mar 9:00pm KQED 9  Finding Gold

Goooooooooogle ▲  Next
1 2 3 4 5 6 7 8 9 10

Results 1 - 10 of 123 for "lost" in the next two weeks

Lost
Wed 13 Mar 10:00pm HISTP 450  The Monkey Suit
Thu 14 Mar 10:00pm HISTP 450  Treehouse of Horror
Fri 15 Mar 10:00pm HISTP 450  The City of New York v ...
6 more »

Lost in Space
Tue 12 Mar 9:00am FOX 12  Monster Attacks Zach
Tue 19 Mar 9:00am FOX 12  Danger! Danger!
[X]  Series/Action - 60 min. HDTV PG-13 new
The robot goes crazy and starts bending metal, calling Will Robinson "Fry" and stealing money from Mr. Smith.
Add the entire series to My Shows    details »

Tue 26 Mar 9:00am FOX 12  Mission Blast-Off
12 more »

Lost in the Annals of Time for the Very Long Titles of ...
Wed 13 Mar 8:00pm DISC 43  Where is Waldo?
Thu 14 Mar 8:00pm DISC 43  Finding Mr. GoodBar
Fri 15 Mar 8:00pm DISC 43  When Cities Collide
14 more »

Goooooooooogle ▲  Next
1 2 3 4 5 6 7 8 9 10

CUSTOMIZABLE MEDIA CHANNELS

TECHNICAL FIELD

This document discusses systems and methods for providing a customized media channel.

BACKGROUND

Some people watch a lot of bad television. While this may be true, often people watch bad television only because they cannot find good television. Indeed, the development of personal video recorders (and VCRs before that) has enabled people to better select the shows they watch, and to avoid watching whatever happens to be on at the moment—via semi-random channel surfing. Thus, people will watch good television if they can find it.

Electronic program guides provide a common mechanism by which people can find television programming. These guides commonly display information about a number of programs in a grid of cells arranged by channel and time—much like their predecessor paper guides, such as those published in the old TV Guide magazines and in newspapers. The information, when displayed on a display device like a television, may be static, in that it is simply displayed to a user on a particular channel, such as in a continuously scrolling grid of channels. The information may also be interactive, in that users can scroll through the grid themselves and can select a certain cell to be switched to a program represented by the cell.

Improved interaction with program guides and an ability to better find and interact with programming information can greatly increase the ability of users to find and manage programming that best suits their needs. As a result, such users can have a better viewing experience and can also watch more of what they enjoy and less of sub-par programming.

SUMMARY

This document describes systems and methods that may be employed to assist a user in finding and organizing programming in which they may have an interest, and that can provide additional information about, or access to, that programming. Examples of programming include various forms of media content, such as broadcast and archived programming, movies, webcasts, pay-per-view content, amateur video content, media previously recorded by the user or other users, etc. Generally, the systems and methods permit for the combination of (1) directed search results of media content, with a display of a list of search results, and (2) tools for organizing the media content in a user-customizable manner.

Search results can be used as a navigational tool to guide discovery in the grid. For example, a user may submit a query relating to certain media programs, and the system may return search results responsive to the query in a list or other similar format. The system may also generate a programming grid that shows one or more of the search results, such as in a grid showing channels and times surrounding the broadcast of the most relevant search result.

The system may further provide a customizable personal media channel to which the user can drag links to content from the programming grid and from other sources. The personal media channel can facilitate further discovery of information related to the linked content in the personal channel, and the personal channel can also facilitate presentation of the linked content in an order and at a time determined by the user.

Such techniques may, in certain implementations, provide one or more advantages. For example, they may permit users to more readily find and organize programming that interests them. In so doing, the systems may couple the power of advanced search engines like the Google search engine, to navigational tools like programming grids. In addition, by allowing users to arrange programming and other media in the manner desired by the user, the user can configure an entire session of media (e.g., an evening of broadcast programming and archived movies, or an afternoon of webcasts and digital music). Once configured, the session of media can be presented in its entirety without further user interaction. In particular, for example, the user can enjoy the media without having to change settings of a media player (e.g., channels on a video player or television). Moreover, the entire session of media content can be of interest of the user, having been configured by the user. Thus, the user is not forced to dynamically choose live content from various sources that may only be of marginal interest. Furthermore, the effort required to program a session of media can be greatly reduced (e.g., through a flexible, browser-based interface).

Various features also benefit broadcasters and advertisers. Users may watch (or listen to) more programming if it is something they enjoy, which may in turn result in more advertising revenue for broadcasters from advertisers, and more purchases by consumers from advertisers. In addition, techniques can be used to provide targeted advertising for users, such as by selecting advertisements that are associated with a search request and that tie into programming information shown in a grid (such as advertisements for shows that come on after, or immediately after, a top search result, and on the same or a different channel.) Advertising can be further targeted to users based on user-customizable media selections made by the user In one implementation, a computer-implemented method is disclosed. The method includes receiving an identification of a media program from a broadcast channel on an electronic program guide for inclusion in a personalized channel, adding the identified program to a personalized channel at a first time, and adding one or more additional programs to the personalized channel at times other than the first time. The identification of a program may include sensing a drag-and-drop command from a cell in a program guide to the personalized channel. The one or more additional programs may also overlap in time with the identified program. The method may additionally include identifying a non-overlapping time for the identified program and the one or more additional programs, and moving one of the identified program or the one or more additional programs to eliminate the overlap.

In some aspects, the method also comprises providing code for causing the display of advertisements targeted to a user or to the identified program or one or more other programs. In addition, the method can also include providing code for causing the automatic playing of each of the identified program and the one or more other programs in a predetermined order. Moreover, the method can include identifying advertisements targeted to the identified program or the one or more other programs and providing the advertisements for display between program segments. In addition, the method can further comprise receiving a search request from a user and providing for display to the user a list of search results and the electronic program guide, wherein the electronic program guide displays a program responsive to the request.

In another implementation, a computer-implemented method is disclosed. The method includes displaying media programs in an electronic program guide grid identifying a plurality of different channels, receiving a user selection of one of a program episode associated with one of the plurality of different channels, and adding the program episode to a personalized schedule of television programming to be displayed over a future time period. The method can also include identifying gaps in programming on the personalized schedule and generating a command to select downloadable media from the internet to fill the gaps. The downloadable media may be targeted at least in part to characteristics of one or more programs in the personalized schedule. Also, the method can further comprise displaying media in the personalized schedule automatically in order.

In yet another implementation, a computer-implemented method is disclosed and comprises displaying an electronic program guide grid having a plurality of channels, receiving a command to add an episode from one of the plurality of channels to a personalized channel, and combining the selected episode with other programs in the personalized channel. The method may also include generating a user alert for overlapping programs on the personalized channel and moving one or more episodes to eliminate the overlap. The command to add an episode may also comprise a drag-and-drop command from a cell in one of the plurality of channels to an area defined by the personalized channel.

Another disclosed system includes a media store holding recorded media programs for a user device, a media player controller programmed to arrange programs from a plurality of different channels on a personalized channel to permit automated and continuous playthough of the media programs, and a media recorder under control of the media controller to record programs for later playback on the personalized channel. The system can also comprise an internet-connected interface for receiving streaming media, and wherein the media player controller is programmed to play streaming programs and recorded programs. Moreover, the interface can be configured to receive advertisements targeted to a user or programs on the personalized channel and to provide the advertisements for display under control of the media player controller. In addition, the system may include a runtime component for generating a display of an electronic program guide grid showing the personalized channel and the plurality of different channels. The runtime component can generate requests for programming information and provides information received in response to the requests for display in the program grid.

The details of one or more embodiments are set forth in the accompanying drawings and the description below. Other features, objects, and advantages will be apparent from the description and drawings, and from the claims.

DESCRIPTION OF DRAWINGS

FIGS. 1A-1C show particular displays from FIG. 1.

FIGS. 3A-3D show example displays providing media search results and details for such results.

Like reference symbols in the various drawings indicate like elements.

DETAILED DESCRIPTION

Figure 1:
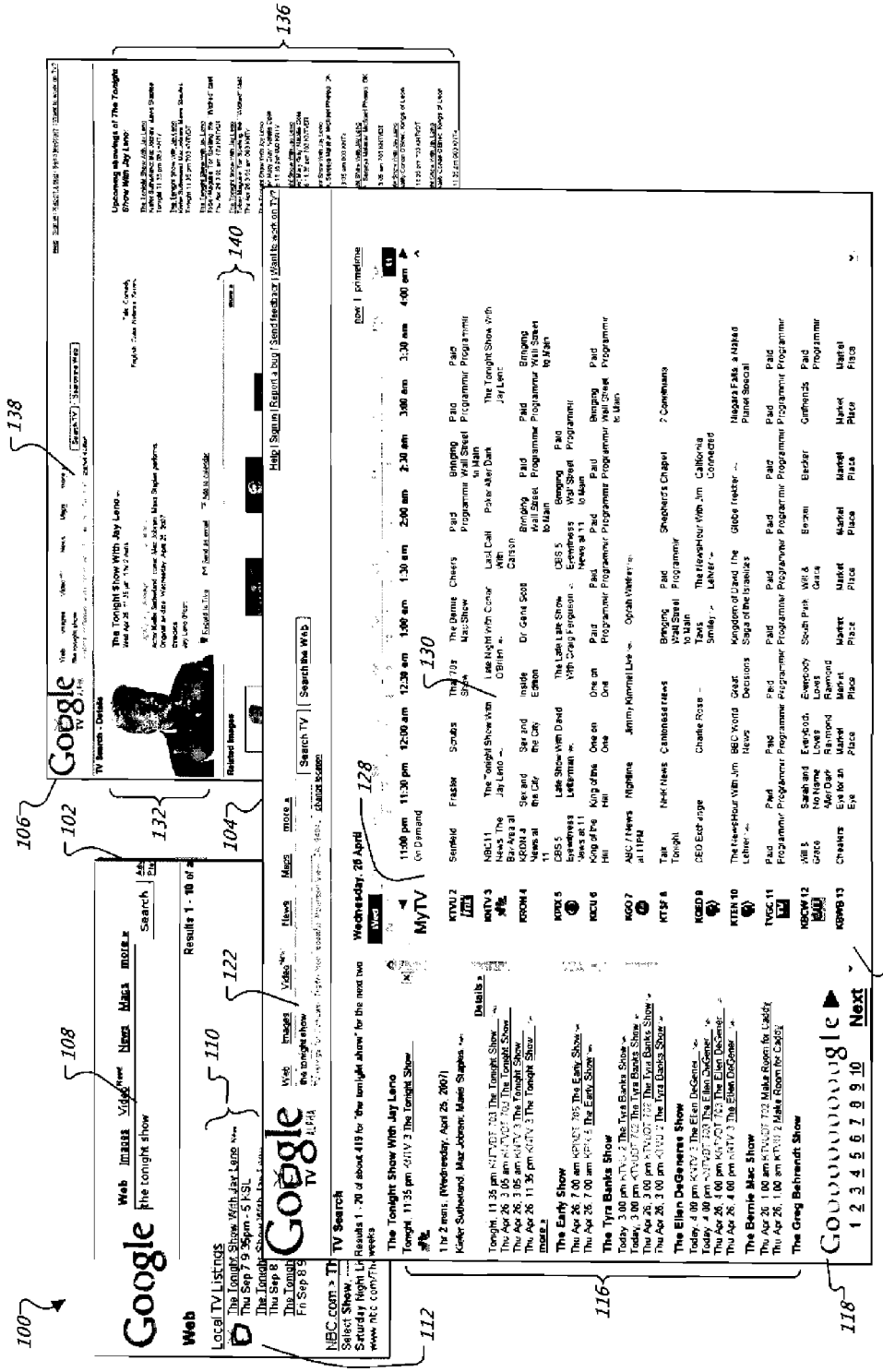
FIG. 1 shows displays illustrating interactions provided by an example program guide system.
Figure 1A:
Figure 1B:
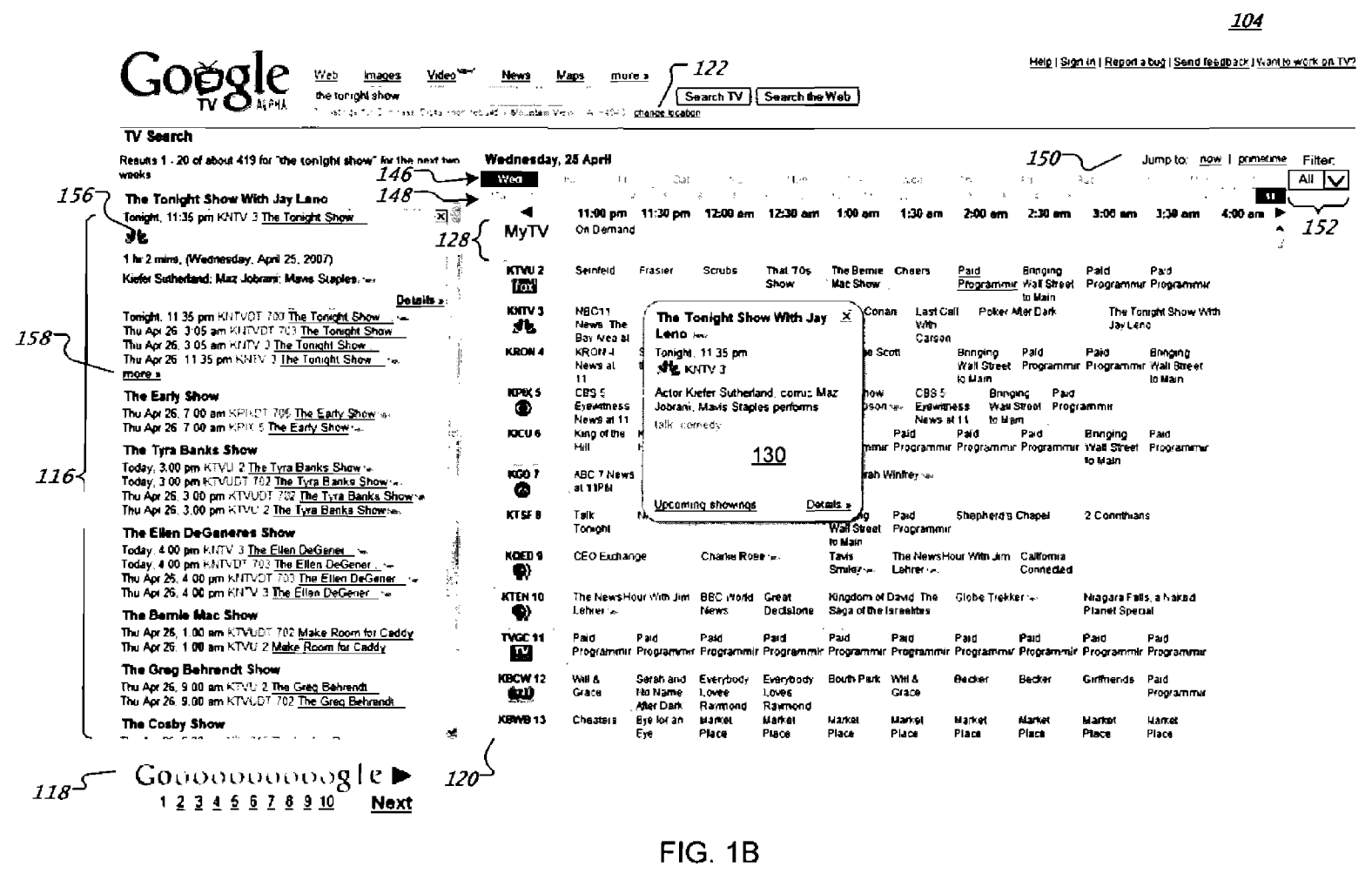
Figure 1C:
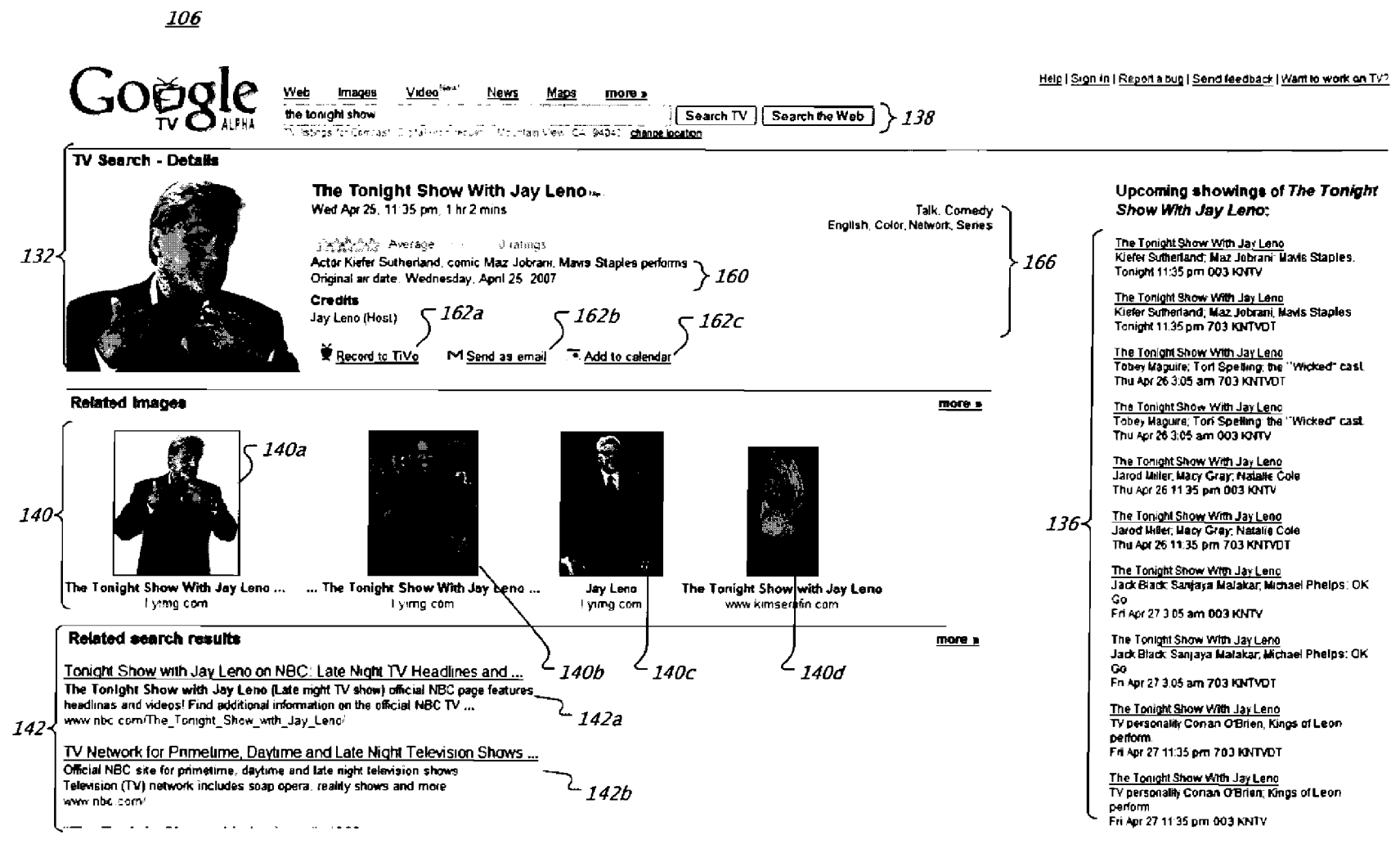

FIG. 1 shows displays illustrating interactions provided by an example program guide system 100, and FIGS. 1A, 1B, and 1C show particular displays from FIG. 1. In general, the program guide system 100 allows a user to search for media programming (e.g., broadcast television, cable television, satellite television, broadcast radio, satellite radio, and Internet media) by making a search request using a search page 102. The program guide system 100 presents, on the search page 102 and/or on a landing page 104, search results that are based on the search request.

The search results include a list of one or more collections of programs related to the search request—grouped by episodes of a program. An episode as used here can include a particular showing in a series of showings (such as an episode of a sitcom), or may include a single episode of a program (such as a movie or a discrete on-line video). The search results also include a program schedule grid 120 that displays a list of channels and program episodes presented by each of the channels for a particular time period. At least one of the program episodes in the schedule grid relates to the search request made by the user. In response to a user selection of a program in the schedule grid or the list, the program guide system 100 presents detailed information associated with the program in a details page 106.

In more detail, the search page 102 includes a search box 108 where a user may input a search term, such as a portion of a television program name. The search page 102 presents preliminary search results based on the search term input. The preliminary search results may include, for example, a list of web pages having information related to the search term. In addition, the preliminary search results may include a list 110 of media programming related to the search term. The media programming list 110 may include text, such as "Local TV Listings," that identifies items in the list 110 as media programming as apposed to web page items. The media programming list 110 also includes one or more media icons 112 that indicate the types of media programming presented in the list 110, e.g., a television, radio, or webcast icon.

Where the system is able to determine that a search request was likely media-related, it can group the media results in a manner that differs from an ordinary list of search results. Specifically, as shown, each of the listings on search page 102 is shown with a title, time, and channel, whereas standard search results may be shown with a title, snippet, and URL. This special formatting of a search result may be referred to as a "one box." Other search results, such as weather, location, and similar results may also be presented in a specially-formatted one box.

The program guide system 100 may present a landing page 104 in response to a user selection of an item in the list 110. The landing page 104 includes media result groupings 116. The groupings 116 list one or more collections of programs related to the search term. The groupings 116 group collections of programs, for example, by program name with each item in a grouping being a particular episode or airing of the program. Alternatively, the groupings 116 may be grouped using another parameter, such as grouping by the media channel presenting the programs, a genre of the programs, or the time of day the programs are presented. An additional results control 118 allows a user to navigate to other groupings that are not currently displayed, and that may be groupings considered to be less responsive to the user's request.

Each of the groupings 116 may also include a "more" control 158 that lists additional results within the particular grouping. In the pictured example, the three next-pending programs are shown for the media grouping associated with the television program "The Tonight Show", and a user can select the "more" control 158 to show addition programs further in the future. Such a selection may cause the Tonight Show grouping to expand and may also cause the other groupings to be removed to make room for the expanded grouping.

The groupings can also include an "Add to my TV" control that, when selected, can add a particular program (such as a series of episodes) or episode to a personalized program guide for the user. For example, a "My TV" channel may be maintained for a user, as described below, and an episode or all the episodes of a program may be added to that channel when the "Add to my TV" control is selected.

The landing page 104 also includes a schedule grid 120. The schedule grid 120 is displayed adjacent to and side-by-side with the groupings 116. The schedule grid 120 presents programming for a particular geographic location. A user may specify or change his or her location by selecting a change location control 122 and by making an input, such as a postal code (e.g., a ZIP code) or city and state names. The selected location may also be used to determine the programs presented in the list 110 and the groupings 116. Where the user is a user registered with the system 100, the user's default location may be used to generate programming suggestions.

The schedule grid 120 presents media programming for a particular time range on a particular date, such as over several hours. A user may select the date using a calendar control 146. The calendar control 146 may default to a particular date, such as the current date. When a search is performed, the grid 120 may default to the area surrounding the time and channel of the episode determined to be a best search result. Selection of other episodes in the groupings 116 may cause the grid to move automatically to display programs around the selected episode (or the first-returned episode for a particular grouping, if a grouping is selected).

The schedule grid 120 presents a list of media channels vertically along its left side and times of day horizontally along its top side in a time bar 148. The programs or episodes for a particular channel are presented in the channel's row and in a column having a time division closest to the actual time that the program is presented by its associated channel. The channels may be associated with a particular numerical channel for a broadcast, or may be a virtual channel such as a personalized channel or a stream of information over the internet.

The schedule grid 120 also includes a personalized channel 128, termed here as "My TV." The personalized channel 128 includes controls that allow a user to create a virtual channel using content from actual channels, another personalized channel, such as the personalized channel of another user, or from other sources, such as stored or archived programming available from a networked source or from a networked media recorder employed by the user. A user may select a program from the schedule grid 120 to add to the "My TV channel." For example, a user may also choose to drag a program or episode from an area such as part of the programming grid 120 onto the personalized channel 128, such as by selecting a cell 130 in the grid. In addition, the user may select a control such as the "Add to My TV" control, where that control is associated with a program or episode. Media content, such as episodes, programs or other media content may be added to the personalized channel 128 in a variety of other ways as well. For example, one user may send a message to a second user that identifies a particular program, such as by supplying a URL or other link to the particular program. The message may include a control that allows the second user to add the particular program to his or her "My TV" channel. As another example, a separate list (not shown) may be maintained next to the grid that includes other content associated directly with the user, such as content the user has previously recorded (e.g., using a personal video recorder) or content the user maintains in a media account (e.g., an account associated with a media provider or a network-accessible online media provider).

In the implementation shown in FIG. 1, the schedule grid 120 includes the personalized channel 128. The personalized channel 128 is presented near the top of the grid 120 and slightly separated from the other channels to indicate that its programs are specified by the user rather than by a media provider broadcast. The personalized channel can include multiple overlapping programs, and a user may be provided with various mechanisms with regard to watching and managing such programs. As one example, the programs may be initially displayed according to the times they are broadcast or are first made available for download. The user may then drag them later into time so that they do not overlap, so as to "program" a viewing schedule that the user may later follow. Broadcast programs that are shifted in time from their actual broadcast time may be recorded, such as by a PVR, and displayed according to the program the user has established. Non-broadcast programming (e.g., pre-recorded media content, network-accessible archived content, etc.) can be retrieved and displayed at an appropriate time in the viewing schedule. In this manner, a user can easily select broadcast programs to view, see whether the selected programs can be viewed when they are broadcast, and view the programs in a selected order as if they were live programs, but by time-shifting the programs in some selected manner. Moreover, the user can intersperse with broadcast programming media content from non-broadcast sources, in order, for example, to create a customizable session of media content. The personalized channel 128 is described in more detail with respect to FIGS. 2A and 2B below.

A selected program cell 130 may be used to initiate an operation related to the program in other ways also, such as navigating a user to a display that presents more detailed information regarding the program. The details page 106 presents such detailed information. The details page 106 includes a program details area 132. The program details area 132 presents detailed information regarding the program, such as a genre of the program, a runtime length of the program, names of performers in the program, a content rating of the program, a quality rating of the program, and a synopsis of the program.

The program details area 132 also includes an upcoming episodes area 136. The upcoming episodes area 136 presents a list of the upcoming episodes for the program. The list may include detail information such as an episode title, a time for the showing, and a channel on which the showing is to occur.

The details page 106 also includes a search control 138. The search control 138 allows a user to input a search term to initiate a search for a particular program. The search may be limited just to a corpus of information associated with programming, or may be performed on an entire web page corpus, depending on a selection from the user.

The details page 106 also includes an image details area 140. The image details area 140 presents images associated with the program, such as image result 140*a*. The image result 140*a* may be found by performing an Internet search for images related to the program, such as would be returned by the standard "Google Images" service. The search may be constrained in particular ways, such as by searching on a particular programming-related corpus of images or by adding certain terms, such as "television" to the query so that "Fred Thompson" returns images of the actor and not of other people. Details including a snippet, image details, and a URL that displays the image, are also provided in image details area 140.xxxApril 25, 2007xxx The details page 106 also includes a search details area 142. The search details area 142 may present the results of a search for web pages related to the program, such as a search result 142*a*. The search details area 142 may simply be a proxy of results that would be shown in response to a standard search for the episode name when applied to a full corpus or a corpus limited to programming related information. Controls may also be provided so that the user can access more episodes, more image results, more search results.

In operation, a user may initiate the program guide system 100 either by inputting a search term, such as "The Tonight Show," for a general web search using the search control 108 or a media programming search using the search control 138. In the case of the search control 108, the program guide system 100 presents the list 110 of programs related to the search term "The Tonight Show" within the search page 102 as part of a one box. Selecting a program in the list 110 directs the user to the landing page 104.

Alternatively, a user may input the search term for "The Tonight Show" using the media programming search control 138, such as is displayed on the landing page 104 or the details page 106. The search input directs the user to the landing page 104.

At the landing page 104, a user may direct the schedule grid 120 to a particular channel, time, and date by selecting a program from the groupings 116. The groupings 116 are programs determined using the search term "The Tonight Show." Each program grouping includes one or more episodes of that particular program. The user may navigate to groupings not currently presented using the additional results control 118. Selecting a particular episode in a program grouping directs the schedule grid 120 to a particular channel, time, and date. The user may also navigate through the schedule grid 120 manually using controls, such as the calendar 146 and the time bar 148. In addition, the user may "drag" the control up, down, left, or right similar in manner to moving a map in Google Maps, and cells in the grid may be added from a queue to be displayed, and additional cells may be fetched or pre-fetched, in the manner of fetching tiles around a display in Google Maps.

Such fetching of tiles may occur by various mechanisms. For example, the system may simply pre-fetch tiles that surround the area currently being displayed (within a certain number of tiles). Also, the fetching may proceed to fill in all channels at a currently displayed time, and then fetching information in the future or in the last direction of time-wise travel in a grid (e.g., if a user's last move was to the right, then future tiles will be fetched). This technique operates under the assumption that people are more likely to surf through channels than to look into the past or future. Under a third technique, the pre-fetching may approximate the momentum of the movement of the grid—much like air over the surface of a moving wing. More material is pre-fetched in the direction of motion (where there can be three dimensions: time, channel, and level of detail). Where motion is particularly fast, more material is fetched in the directed of motion and less to the sides of the grid. As a user's motion slows, more data in other dimensions away from the motion may be pre-fetched.

Regarding a third grid dimension for detail level, such a dimension may be implemented in various manners. In one such implementation, at a least detailed level, a program title and little more may be shown in a grid so as to permit maximum density of tile display. At a more detailed level, a rating and a short description of an episode may be shown. At a yet more detailed level, more detailed description may be shown, and an image may be shown. At a more detailed level, information duplicating or approaching that shown for the detail page 106 may be shown.

The user may navigate to the details page 106 for a particular program by selecting (e.g., clicking or double-clicking on) the program in the schedule grid 120, such as the selected program cell 130. At the details page 106, a user may view detailed information regarding the program in the program details area 132. The detailed information may be obtained, for example, from a structured database that organizes media content according to programs, actors, and other similar parameters and links the information in a relational manner.

The user may view images related to the program in the image details area 140. The images may be obtained from a structure database, such as a database associated with the detailed information, or may be obtained from disparate sources such as in the manner of Google Image Search. The user may navigate to an image by selecting an image result, such as the image result 140*a*.

The user may navigate to a web page related to the program by selecting a search result, such as the search result 142*a*, in the search details area 142. The user may also select an image in image details area 140 to have the image associated with the program. For example, the selected image may then be displayed in the details area 132 in place of the prior image, or a portion that is cut out of the image may be displayed in the grid 120, such as in cell 130, so that a user can make particular favorite programs more visible in the grid in a manner that the user can visually associate the cell 130 with the program (e.g., by selecting a logo or title associated with the program).

FIGS. 1A-1C show particular displays from FIG. 1 in more detail. FIG. 1A shows the search page 102. The search page 102 allows a user to search for web content using the search control 108. The program guide system 100 determines that the search term (e.g., "lost") may be a media program. For example, if the search term matches a media program name (such as a term stored in a "whitelist" of media-related terms or of popular or new television series or movies) or the search term is included in a media program name, then the program guide system 100 may generate and present the list 110 of media programs.

Alternatively, the search term may be another attribute of a media program, such as the program's channel, an actor in the program, or the program's format (e.g., drama or situation comedy). A user may also "force" a media search, such as by preceding a search term with a prefix such as "tv", "tv:", or "television." The program guide system 100 can also employ blacklists to filter out hits that are unlikely to be relevant to a user. For example, even if a user query includes "tv," certain queries, such as "plasma tv" may be unlikely to be directed to media.

In addition to a name of a media program, the list 110 presents a time, date, and channel for the media program. The list 110 also indicates whether the particular presentation of the program is new or a repeat. The results in the list 110 may be ordered by relevance to the search term, whether the program presentation is new, and/or the date and time that the program is presented.

The media icon 112 indicates that the list 110 presents media programs. The media icon 112 visually distinguishes the list 110 from general web page search results, such as web page search result 113. The search result 113 is also related to the search term "lost." The search result 113 includes a title that identifies the web page, a uniform resource locator (URL) to navigate to the web page, a link to a cached copy of the web page, a link to web pages similar to the web page, and a link to note the web page, such as in a personalized web notebook like Google Notebook. Noting the web page stores information about the web page in a web notebook associated with the user.

FIG. 1B shows the landing page 104 including the media result groupings 116 and the schedule grid 120. The groupings 116 present a list of programs matching a particular search term. The matching programs are selected from channels that are available to the user, such as from local broadcast or other media providers. A particular head-end associated with the user may also be associated with the displayed programs.

The location and media providers accessible by the user may be selected using the change location control 122.

The schedule grid 120 presents the programs matching the search term as well as other programs occurring around the time of the matching program. Selecting a particular instance of a program (e.g., an episode or broadcast) in the media result groupings 116 moves the schedule grid 120 up or down to a channel associated with the program and left or right to a time associated with the program. This presents the program instance in the schedule grid 120. The schedule grid 120 may immediately present the selected program or may gradually present the program, such as by slowly scrolling to the grid location of the program.

In certain implementations, a user may select a program instance or episode in the schedule grid 120 to generate a new list of programs in the media result groupings 116 related to the selected schedule grid program. In such a situation, the selected program name or another program attribute may be submitted as a programming-directed search request to the system in generating a new landing page 104.

Programs in the schedule grid 120 that also appear in the groupings 116 are highlighted to indicate that they match the search criteria that generated the groupings 116. The highlighting may be, for example, a shading, color, grid cell size, or cell border thickness that differentiates the schedule grid programs satisfying the search condition from schedule grid programs that do not satisfy the search condition. In certain implementations, the shading, coloring, or sizing varies based on, for example, the closeness of the match between the search term and the program.

Alternatively, the shading, coloring, or sizing may vary with the degree of separation between programs matching the search term and programs related to the matching programs. For example, a user may input a search term such as "Star Trek II: The Wrath of Kahn." Instances of the movie "Star Trek II: The Wrath of Kahn" in the schedule grid 120 may be highlighted with a first highlighting that is more significant than subsequent highlighting (e.g., a bright color (red for close hits moving to blue for farther hits), dark shading, or larger sizes). Instances of Star Trek movies other than "Star Trek II: The Wrath of Kahn" in the schedule grid 120, such as "Star Trek: The Motion Picture," "Star Trek III: The Search for Spock," "Star Trek IV: The Voyage Home," "Star Trek V: The Final Frontier," "Star Trek VI: The Undiscovered Country," "Star Trek: Generations," "Star Trek: First Contact," "Star Trek: Insurrection," and "Star Trek: Nemesis," may be highlighted with a second highlighting that is less significant than the first highlighting. The second highlighting indicates that the associated programs may not match the search term, but they are related to the programs that match the search term (e.g., they are other Star Trek movies). In addition, episodes of Star Trek series programs, such as "Star Trek: The Original Series," "Star Trek: The Animated Series," "Star Trek: The Next Generation," "Star Trek: Deep Space Nine," "Star Trek: Voyager," and "Star Trek: Enterprise," in the schedule grid 120 may be highlighted using a third highlighting that is less significant than the second highlighting. The third highlighting indicates that the Star Trek series programs may not match the search term and may not be the same type of media as the programs matching the search term (e.g., movies), but they are related to the programs through the Star Trek genre.

In another example, a user may input a search term for media programs having a particular actor or performer, such as "Leonard Nimoy." Media programs in the schedule grid that include the actor "Leonard Nimoy," such as "Star Trek: The Original Series," are highlighted with a first highlighting. Media programs having actors that have at some time performed with "Leonard Nimoy" are highlighted using a second highlighting. For example, episodes of "T.J. Hooker" and "Boston Legal" may be highlighted using the second highlighting as they include the actor William Shatner who starred with Leonard Nimoy in "Star Trek: The Original Series." However, episodes of "T.J. Hooker" in which Leonard Nimoy guest starred or directed may be highlighted using the first highlighting. The highlighting may also occur by placing images in the cells, so that programs involving Nimoy include a partial photographic portrait of Nimoy, and programs involving Shatner include a partial photographic portrait of Shatner. Other variations in formatting are possible based on how many "degrees of separation" exist between a displayed program and a user's original search term. For example, a third color or highlighting may be applied to programs having actors who starred with William Shatner (and who are thus "related" to Leonard Nimoy but separated by, e.g., two degrees of separation).

In addition to highlighting programs matching the search terms in the schedule grid 120, the groupings 116 may also highlight the programs. The highlighting used in the groupings 116 may match the highlighting used in the schedule grid 120 for corresponding media programs. The groupings 116 may also present the media programs that are related to the media programs matching the search term.

The groupings themselves may also be highlighted, such as by including an image associated with each grouping as a watermark behind the grouping. Such an additional feature (not shown) may add decorative interest to the search results, and may also provide additional information to a user. For example, a user may have no idea what the text "Square Pegs" means, but when shown a photo that includes Jami Gertz, Tracy Nelson, and Sarah Jessica Parker, they may instantly recognize the iconic Emmy-nominated 1982 program about Weemawee high school.

The schedule grid 120 has an associated calendar control 146. The calendar control 146 includes tabs that allow a user to select a particular date or day of the week. Each tab includes hours of the day associated with the tab. Selecting a time interval in the tab directs the schedule grid 120 to present programs for the selected day and time interval.

The schedule grid 120 has a time bar 148 that indicates the times of day that programs in the schedule grid 120 are presented. The time bar 148 includes controls that allow a user to move to an earlier or later time or date. Alternatively, a user may move the schedule grid 120 by another method, such as by clicking on the grid 120 and dragging the grid 120 to a new time or date. The clicking and dragging may also move the grid 120 to present other channels. Alternatively, a user may use a control, such as a scroll bar, to move through the list of channels in the grid 120. As a user moves through times, dates, and channels in the grid 120, the landing page 104 may download data for channels and times/dates outside the periphery of the grid 120. This allows the grid 120 to present the programs for the channels and times that appear as a user moves the grid 120, without having to pause to download them.

The schedule grid 120 has an associated jump control 150 and an associated filter control 152. The jump control 150 allows a user to quickly move to the current time and date in the grid 120 or to a primetime (e.g., 8:00 PM) for the current day. The filter control 152 can be used to filter out various parts of the grid. For example, the filter may be used to show only prime time or late night programming, so that, for example, the grid jumps from 11:00 PM directly to 8:00 PM the next day. Likewise, the filter can be used to show only channels in a particular category, such as only movies channels or sports channels, or channels specifically selected by a user as their favorites channels.

In some implementations, the filter can be applied to a user's personalized media channel, for example, to define certain windows during which the user regularly desires to receive media content. In one example, parents can configure a personalized media channel for a child to include, e.g., one hour each weekday after school and two hours each Saturday morning. When activated, such a filter may show gaps in the personalized media channel only during the configured times (e.g., 3:30 to 4:30 PM each weekday and 8:30 AM to 10:30 AM on Saturdays) and show all other times as blocked out. The filter may further prevent content from being added to the personalized media channel, except during configured times for which content is not already configured.

In some implementations, the filter can be configured to cause certain content to be displayed or not displayed in the grid or in search results. In particular, referring to the above example, a filter can be set up to only display media content that has been rated for children. That is, the filter may limit content that is displayed in the grid or in other search results and that is available to be added to the personalized media channel.

In some implementations, a filter can be used to determine how content in the personalized media channel is to be processed. For example, a user may "hardcode" a local news broadcast into his or her personalized media channel, followed by an episode of "Star Trek: Next Generation." The user's personalized media channel may be set up to cause this content to be recorded (e.g., using a network-accessible PVR) if the content is not viewed live, but filter settings may determine how the recorded content is subsequently processed. In particular, for example, the filter may be configurable to cause the news broadcast to be automatically discarded if it is not viewed within a certain period of time (e.g., 12 hours) and the Star Trek episode to be saved for some other period of time (e.g., three weeks, indefinitely archived, etc.).

Filtering could further be related to a user's calendar. For example, portions of any given day for which a user (e.g., in an associated network-accessible calendar) has other appointments or commitments, can be filtered out. That is, a schedule grid 120 or a personalized media channel can be grayed out during such times. In some implementations, if media has already been scheduled for such times, the media may be automatically recorded and archived for later viewing.

Past media selections by a user can be employed to filter future media search results. For example, a system can track media content that is presented to a user for a predetermined period of time (e.g., one month), and the system can filter the tracked media content out of future search results within the predetermined period of time to help narrow the user's selection of future media content and to prevent the user from inadvertently repeating a presentation of the same media content.

The media results groupings 116 provide a compact area to view the results of the media programming search. Particularly, each grouping may present a number of programs that is less than the total number of programs in the grouping. For example, each grouping may represent a media program series and may present up to three episodes from the series. A program identifier 154 identifies the name of the series or grouping. The episodes or instances of the program are represented by schedule entries 156. A more control 158 indicates when more episodes or program instances exist that are not shown in the schedule entries 156. The more control 156 also indicates how many more entries exist. A user may select the more control 156 to present the additional entries. In addition, a user may select the additional results control 118 to present additional groupings. The additional results control 118 indicates the number of additional pages of media results groupings. A user may select a particular page of media results groupings to be presented in the groupings 116.

In addition to the groupings 116, the landing page 104 can display archived content (not shown) that is also relevant to a current search. For example, a user may maintain a library of "Lost" episodes from an earlier season, and such episodes may be listed below the grouping 116. In some implementations, a separate display area (not shown) is provided on the landing page 104, which displays, or links to, archived material, regardless of the relevance of the archived material to a current search.

The archived material could be, for example, pre-recorded media content that a user has designated for archiving. Additionally, the archived material could include media content that has been recently recorded (e.g., to present in a time-shifted manner in a personalized media channel). The archived material could be stored in a local media player, or the archived material could be stored in another (e.g., network-accessible) storage medium. In some implementations, such media content can also be added to and played from a personalized media channel. Some users could use such a feature to create media sessions that mix broadcast media with archived media (e.g., movies the user has purchased, the user's music or music video library, a user's library of how-to, self-help, or exercise media, etc.).

When the landing page 104 is resized, for example as a result of a user input, the schedule grid 120 may be resized accordingly. The addition or subtraction of page space may be divided among the cells of the grid 120. The cells of the grid may have minimum and maximum sizes, such that if the minimum or maximum sizes of the cells are reached rows and/or columns may be removed or added, respectively, from the grid 120. In addition, text within individual cells in the grid 120 may be added or subtracted based on the size of the grid. For example, more text (e.g., a title and a short description) can be provided in each cell in the grid 120, if the overall size of the grid 120 is relatively large. Conversely, if the grid 120 is relatively small, text in each cell can be removed for readability (e.g., such that only the title or a portion thereof is visible). In some implementations, zooming may also be enabled, for example, independently of the size of the grid. That is, a user may be able to zoom in on particular cells or groups of cells to, for example, view more text in each visible cell. The resizing, addition, and subtraction of cells in the grid 120; the addition or subtraction of text within cells in the grid 120; or zooming within the grid 120, may be performed by a client-side script in a web browser, such as JavaScript.

Alternatively, or in addition (such as after the cells have reached a minimum size) the cells may be maintained in constant size and the grid 120 may have its channel and time dimensions shrunk or expanded as the window is decreased or increased in size respectively. Thus, for example, as the window is decreased in size, programs may be cut off in half-hour increments.

FIG. 1C shows the details page 106. As previously described, the details page 106 includes the program details area 132, the image details area 140, and the search details area 142. The program details area 132 shows a list 160 of actors associated with the presented program. A user may select an actor in the list 160 to initiate a search of media programming for the selected actor. The search may direct the user to the landing page 104. Alternatively, such a selection may obtain a details page associated with the actor, such as from the iMDB web site. Similar actions may be taken with respect to producers and others who might be associated with a program.

The program details area 132 includes actions 162a-c that may be performed using the program. The actions 162a-c are described in more detail with respect to FIGS. 4A-4D. The program details area 132 also includes information 166 associated with the program, such as an image from the program, the name of the series, the name of the episode, a synopsis of the episode, the date and time the program is scheduled for presentation, the channel presenting the program, the format of the program (e.g., a drama series), an indication of whether the program was previously presented or if it is a new episode, ratings information, and accessibility information. The information in the program details area 132 may be retrieved from web sites and services, such as a television/cable/satellite listings service and/or a movie/television information database.

The image details area 140 presents images and image information associated with the program. The images are retrieved by performing a search, for example, of the Internet, images previously retrieved form the internet, or another corpus, using the search term or other information associated with the program.

The search details area 142 presents web pages and web page information associated with the program. The web pages are retrieved by performing a search, for example, of the Internet using the search term or other information associated with the program.

A user may select one of the images 140a-d and be directed to a web page where the image may be found. In addition, the user may select one of the web page links 142a-c to be directed to the web page where a reference to the program was found. In certain implementations, the user may input a rating and/or comment for the program. Other users may then view the rating (or a composite rating form multiple users) and/or comment provided by the user. In certain implementations, a user may customize the types of information presented in the details page 106, such as images, web pages, videos, or other media.

Figure 2A:
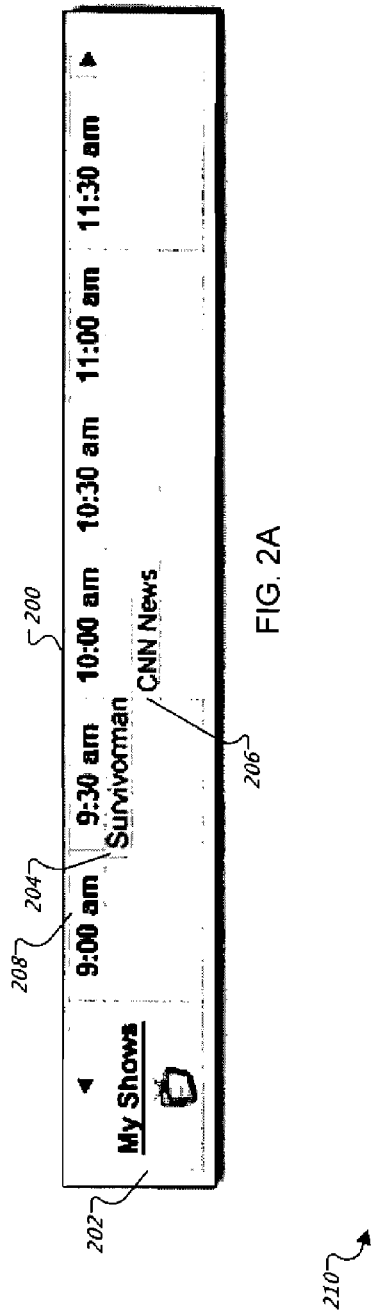
FIG. 2A shows an example display for a personalized media channel.

FIG. 2A shows an example display 200 for a personalized media channel 202. The particular displayed channel 202 includes two media programs 204 and 206. The programs 204 and 206 may be added to the channel 202, for example, by selecting and dragging the programs from a media result grouping or a schedule grid to the channel 202. Multiple episodes may be added to the channel when such a selection is made.

Alternatively, programs in the groupings or the schedule grid may include controls that add the programs to the channel 202. Other forms of media may be added to the channel 202, such as over-the-air broadcast radio, Internet radio, web casts, or content from a digital music player. Where gaps in the programming occur, the gaps may be filled with content such as music or advertisements, which may be downloaded from an internet-accessible source, and may be selected according to characteristics of the user and/or characteristics of the programming, or a combination of the two. For example, as described above, the dialogue in a program may be analyzed by using the closed caption text for the program. The ads may be targeted to keywords associated with the user and/or the program.

In some implementations, ads can be further targeted based on specific programs or other media content that is included in the personalized media channel. In particular, the content of the personal media channel can be analyzed to infer interests of the user, and ads can be provided that are likely to relate to the inferred interests. For example, a user who adds several do-it-yourself programs to his her personalized media channel may receive more ads for Home Depot, Lowes or DeWALT than a user who adds several cooking shows to his or her personalized media channel; the latter user may, instead, for example, receive more ads for Calphalon and T-FAL. As another example, a user who adds programs related to several general topics may receive more ads from entities that are associated with more than one of the general topics. In particular, for example, a user who adds both do-it-yourself programs and cooking shows to his or personalized channel may receive a higher proportion of ads from Black & Decker than from other advertisers, since Black & Decker makes power tools appropriate for do-it-yourself remodelers, as well as toasters and other cooking implements.

Ads may be delivered in various ways. For example, when content is presented from a user's personalized media channel, various "standard" ads may be provided, some of which (e.g., every fifth ad) may be replaced with ads that have been specifically targeted to the user based on inferred interests. In some implementations, ads during a program are targeted based on keywords or profiles established for the specific program, and ads between programs are based on inferred user interests.

In addition to inferring user interests in order to provide user-targeted ads, a system can infer user interests based on the user's previous media selections and suggest content for the user's personalized media channel. For example, if a user individually drags three episodes of Bones into his or her personalized media channel, the system may either suggest a fourth episode of Bones at another time, or the system may suggest that the user add the corresponding series of episodes. The system could make such a suggestion in a number of ways. As one example, a pop-up dialog box could be displayed to query the user about adding either a fourth episode or the entire series of episodes. As another example, a separate list of system suggestions could be maintained (e.g., below other search results 116 (shown in FIG. 1C). In some implementations, suggestions could be filtered based on time of day. For example, news or information programs could be suggested in the morning, even if the news or information programs are not normally broadcast in the morning.

As another example, a system could infer user interests based on the user's previous media suggests and suggest content that is less directly related to the inferred interests. For example, if the system infers that a user is interested in programs starring Meg Ryan, the system could, in addition to suggesting various programs starring Meg Ryan, suggest programs starring Tom Hanks, since Meg Ryan and Tom Hanks have frequently starred in various programs together. In another words, the system could suggest programming that is separated by, for example, one (or more) degree of separation from inferred interests of the user.

In certain implementations, the user may control a home media player using the channel 202. For example, the user may build a list of video programs and audio interludes between the video programs to be presented using the home media player. Certain content, such as the interludes or bumper content (including advertisements) may be automatically suggested or inserted by the system. The selected programs may then be downloaded and/or recorded while being broadcast, and may be stored for later playing with the home media player. Where programming selected by a user overlaps in time, various mechanisms may be used to permit the user to watch all selected shows.

In some implementations, the home media player is directly controlled by a personalized media channel—for example, where the personalized media channel is provided by the media player or by a media service provider associated with the media player. In other implementations, the personalized media channel is maintained separately from and external to either a media player or a corresponding media service provider. In particular, for example, an information provider or search engine provider, such as Google, can provide the personalized media channel. In such cases, the information provider can pass messages over a network to the media player to control the media player in accordance with content in a personalized media channel. In particular, for example, the information provider can maintain an account for the user, into which the user can login prior to running a media search. The user's personal media channel can be associated with that account, and information related to an account associated with the user's media player can also be stored in the information provider account. Based on content of the personalized media channel, the information provider can send messages (using the media player account information, if necessary) to the media player to control its operation (e.g., to record broadcast content that may be scheduled for presentation to the user at a later time in the user's personalized media channel).

The display 200 includes a time indicator 208. In this example, the programs 204 and 206 are presented concurrently in their original channels. As will be described with respect to FIGS. 4A-4D, the user may perform actions using a program, such as recording the program with a digital video recorder. The user may then view the programs 204 and 206 at time of the user's choosing.

In certain implementations, a user may make all or a portion of the channel 202 available to another user. The other user may have the ability to view the programs in the channel 202. The other user may also have the ability to add or remove programs from the channel 202. For example, the user that created the channel 202 may give the other user specific permissions to the channel 202, such as read-only or read/write. In this manner, collaborative media sharing may occur with relative ease. In addition, when media to be played for a user is locally stored media rather than streaming media, a device for one user may transfer the media content to a device for the other user in appropriate circumstances, subject to digital rights management technology present in the systems.

FIG. 2A illustrates a personalized media channel for a single user, but other implementations include multiple personalized channels. For example, a login could be required by a system that maintains personalized media channels, and multiple personalized media channels could be associated with a single login. In particular, for example, a family may share a login, but each family member may have their own personalized media channel. In such implementations, one of multiple channels could be designated as an "active" channel. In particular, for example, if all family members were together for an evening of programming, one family member's personalized media channel could be selected as the active personalized channel. While the whole family was watching the content of the selected personalized channel, the other personalized channel(s) could run (i.e., content on those personalized channel(s) could be skipped). Changing to one of the other personalized channels could cause content to be presented mid-program—much like switching between channels on broadcast television. Alternatively, content in inactive personalized media channels could be archived, and switching from one personalized channel to a second personalized channel could cause unviewed content in the second personalized channel to be delivered from the beginning.

Figure 2B:
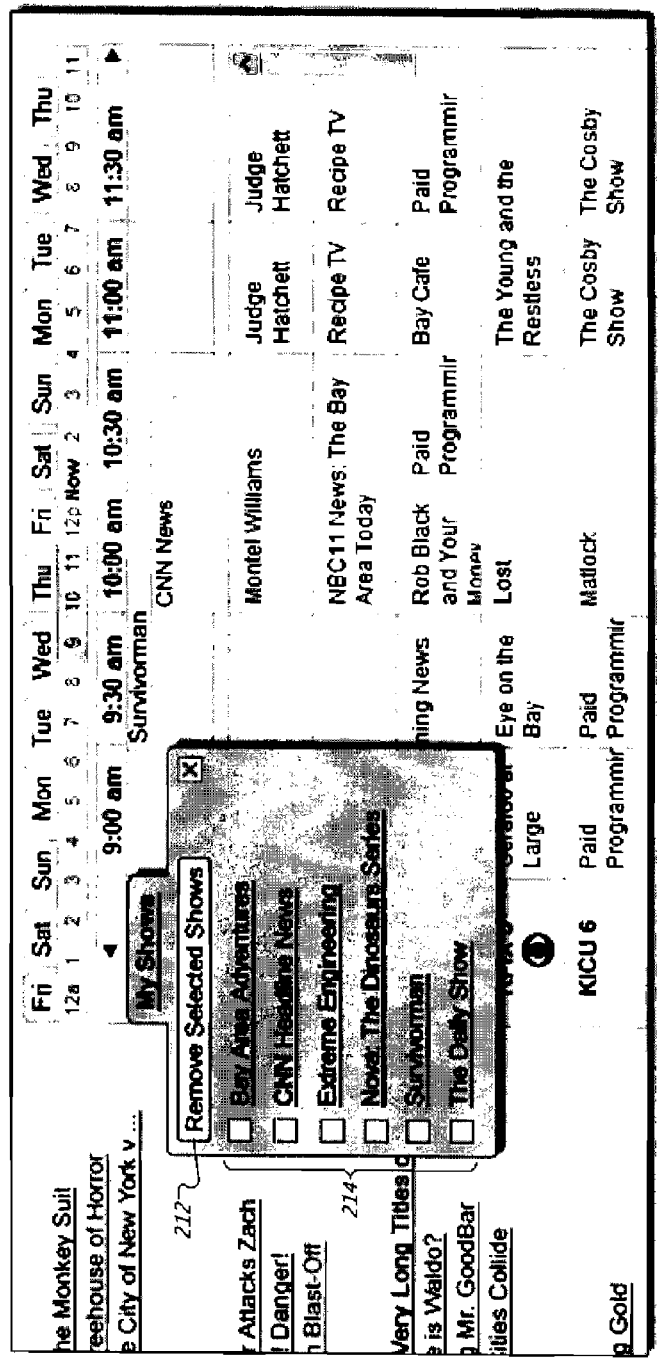
FIG. 2B shows an example mechanism for editing content on a personalized media channel.

FIG. 2B shows an example display 210 for editing content on a personalized media channel. The display 210 includes a remove selected shows control 212 and selection controls 214 corresponding to each of the programs in the personalized channel. A user may select one or more selection controls 214 by checking each show and may then select the remove selected shows control 212 to remove the selected programs from the personalized channel. Alternatively, the user may select a program in the personalized channel directly and drag it out of the personalized channel or the program may have a pop-up menu that allows the program to be removed from the personalized channel (e.g., on right clicking on a cell for the program).

Figures 3C, 3D:
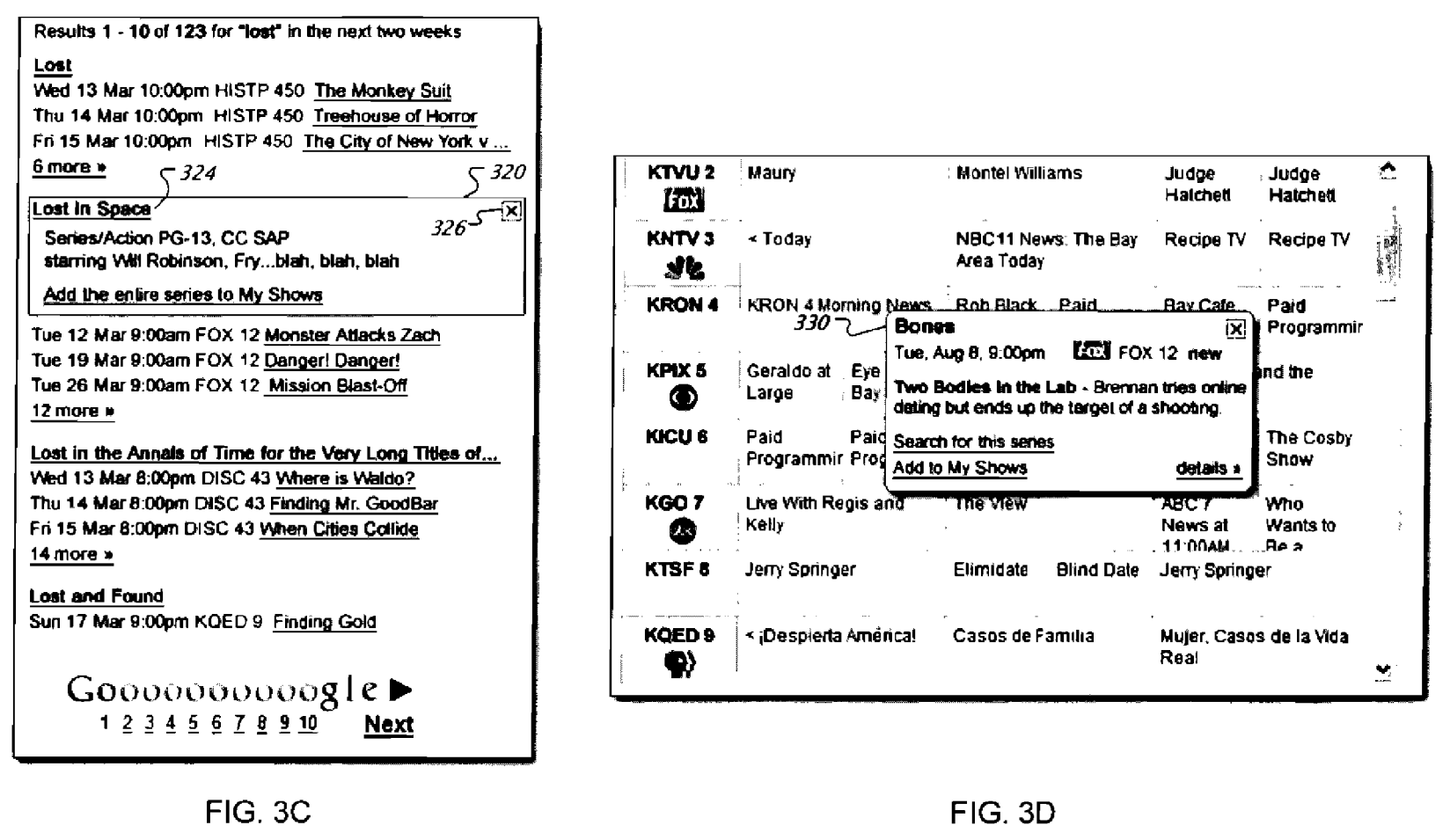

FIGS. 3A-3D show example displays providing media search results and details for such results. FIG. 3A shows a groupings area 300 of a landing page. The groupings area 300 includes groupings 302a-d that correspond to a media program search for the term "lost." Each instance of a program (e.g., an episode) in the groupings (e.g., a series or program) includes a date/time 304 that the program is presented, a channel 306 presenting the program, and a name 308 of the program instance. The name 308 includes a link that moves an associated schedule grid to the program instance (or that opens a details display like those discussed above). Selecting the name 308 may also presents more information about the program instance within the grouping 302d, such as by opening a details page or by opening a sub-window as shown in FIG. 3B. The groupings area 300 also includes an additional results control 310 as previously described.

FIG. 3B shows the groupings area 300 including a detailed information area 312. The area 312 is presented as a result of a user selecting the name of the program instance associated with the area 312. The area 312 presents additional information about the program instance, such as a format of the program, a length of the program, and a synopsis of the program instance. One or more groupings included in the area 300 may be removed when the area 312 is added to maintain the size of the area 300. Particularly, groupings may be removed to keep the additional results control 310 within view at the bottom of the area 300.

The area 312 includes an add control 314 that a user may select to add all occurrences of the program (e.g., all of the program episodes) to the user's personalized channel. An additional control may be included (not shown) to add only the episode corresponding to area 12. The area 312 also includes a details link 316. A user may select the link 316 to navigate to a details page, such as the details page 106. The area 312 includes a close control 318. The user may select the close control 318 to close the detailed information area 312. One or more groupings may be added to the area 300 when the area 312 is closed, while maintaining the size of the area 300 as described above.

FIG. 3C shows the groupings area 300 including a grouping detailed information area 320. The area 320 is similar to area 312, but provides details on an entire series rather than on a particular instance or episode of that series. The area 320 includes information related to the program or series, such as a name of the series, a format of the series, and names of actors in the series. The area 320 is presented in response to a user selecting a name control 324 associated with the program. As with the area 312, the addition of the area 320 may result in one or more other groupings being removed from the area 300. The user may close the area 320 by selecting a close control 326. Again, one or more groupings may be added to the area 300 when the area 320 is closed. Alternatively, the areas 312 and 320 may be pop-up boxes displayed over the groupings area 300.

FIG. 3D shows a detailed information area 330. The area 330 is associated with a particular program in a schedule grid. The area 330 may be a pop-up box displayed over the schedule grid. Alternatively, a cell that includes the program may be expanded to present the additional information. The area 330 presents information related to the particular instance of the program or episode, such as a name of the episode; a date/time the episode is presented; a channel presenting the episode; and a synopsis of the episode. The area 330 may be initiated, for example, by selecting a program in the schedule grid. The area 330 includes controls to add the episode to a personalized channel, to search for other episodes in the program series, and to navigate to a details page (e.g., the details page 106). A background image associated with the program may also be shown in area 330 for decorative purposes and to help orient the user with respect to the program, as described above.

Figure 4A:
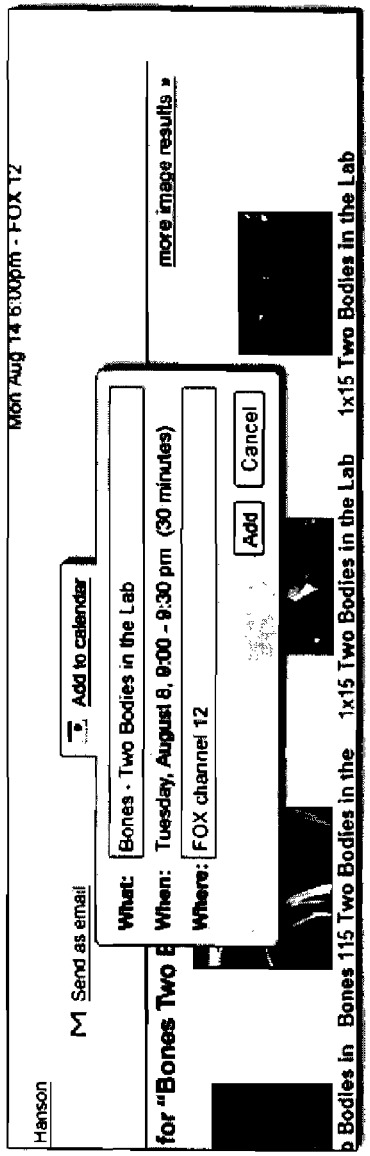
FIGS. 4A-4D show examples of actions that may be taken with respect to media programs.

FIGS. 4A-4D show examples of actions that may be taken with respect to media programs. FIG. 4A shows a display for adding an appointment or reminder to a calendaring application for a particular program. The add-to-calendar display may be a pop-up box presented over a details page, such as the details page 106. A user may initiate the add-to-calendar display by selecting the add-to-calendar control 162c (shown in FIG. 1C). Such a selection may cause an appointment to be entered on the user's general calendar that lists information about the show in the traditional calendar fields, and a user may be allowed to change certain of the information in the fields, as shown by the data entry boxes in the figure. Although not shown, the user may also select an option to add the program to a calendar of an acquaintance, using actions like those used to establish a meeting through a scheduling program.

In some implementations, adding a program to a calendar application also adds the program to a personalized media channel. In such implementations, a user can, in one action, block out an appointment in his or her calendar to view the media content, and at the same time, configure presentation of the media content (e.g., configure, though the personalized media channel, a media player). In some implementations, adding a program to another's calendar (or requesting such addition, though a meeting request-like message, as described above) can cause the program to be added to a personalized media channel maintained by the other user. In this manner, multiple users can efficiently coordinate their program viewing through email-like messages while at the same time, each configuring their respective media players.

Figure 4B:
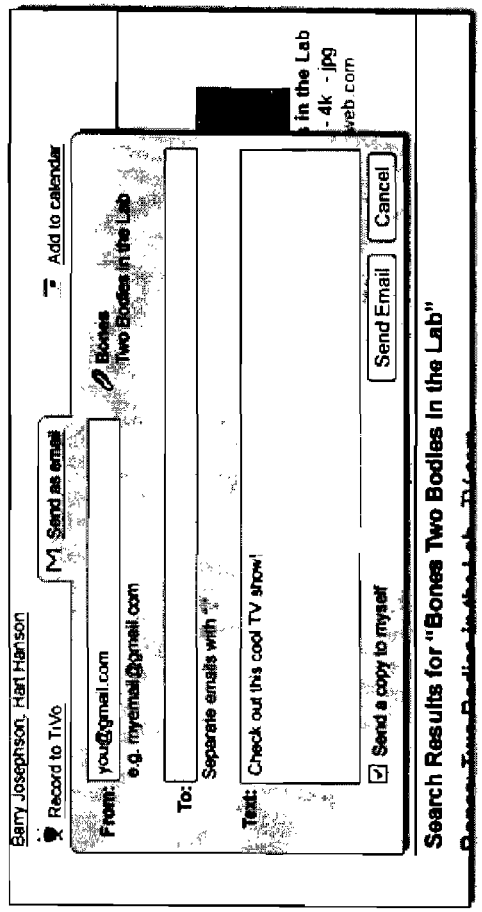

FIG. 4B shows a display for sending an e-mail regarding a particular program. The "send as e-mail" display may be a pop-up box presented over a details page, such as the details page 106. A user may initiate the "send as e-mail" display by selecting the "send as e-mail" control 162b (shown in FIG. 1C). The "send as e-mail" display allows the user to input sender and recipient e-mail addresses. The user may also input a message body for the e-mail. Information regarding the program is sent as an attachment to the e-mail. Alternatively, the program information may be sent in the body of e-mail or the e-mail may include a link to a web page or other web content where the program information may be found and accessed.

Figure 4C:
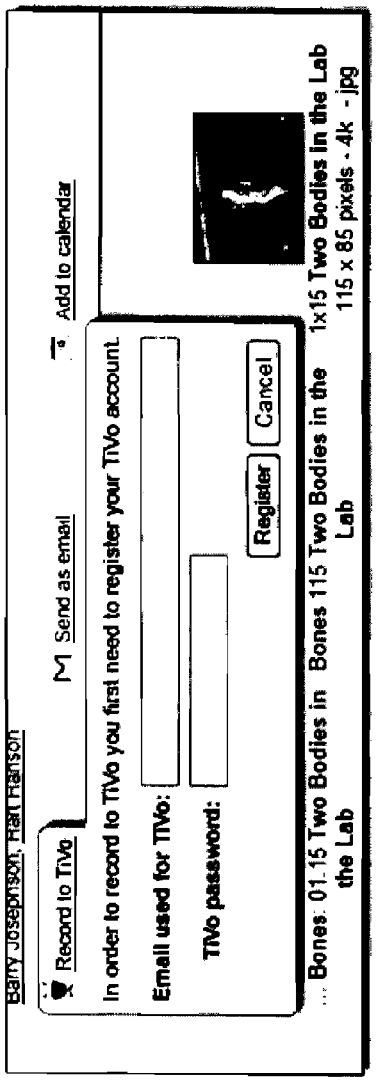

FIG. 4C shows a display for specifying connection information for a recording device, such as a digital video recorder (DVR) or personal video recorder (PVR). The connection information display may be a pop-up box presented over a details page, such as the details page 106. The connection information display may be initiated, for example, when connection information has not been provided and the user selects the record to DVR control 162a (shown in FIG. 1C). The connection information display allows the user to input connection information such as an address and a password for a DVR. In the example shown, the DVR is accessed using an e-mail address. The DVR/PVR may be a piece of hardware separate from a desktop computer, or may be a software program running on a desktop or similar computer, such as on a media center PC.

Figure 4D:
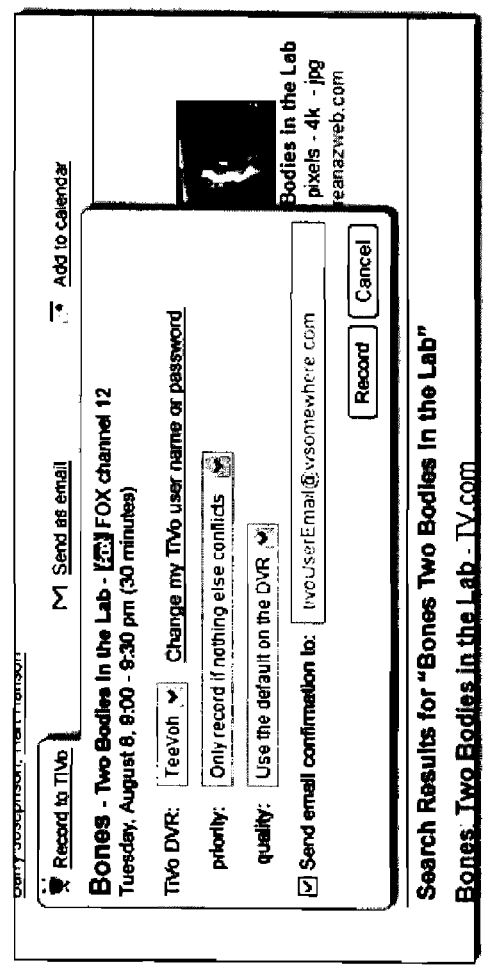

FIG. 4D shows a display for recording a particular program to a DVR (a/k/a PVR). The record to DVR display may be a pop-up box presented over a details page, such as the details page 106. A user may initiate the record to DVR display by selecting the record to DVR control 162a. The record to DVR display allows the user to input DVR settings for the recording, such as a particular DVR to be used, a priority of the recording operation, and a quality of the recording. The record to DVR display also allows a user to send an e-mail confirmation regarding the recording. The particular parameters to be defined may differ depending on the DVR to which the programming is to be sent, so as to match an API or other restriction for the particular DVR.

As discussed above, pre-recorded programs and other media content can be included with other media in a personalized media channel. For example, a user can intersperse archived or otherwise pre-recorded content with live, broadcast media content. Subject to some restrictions, the broadcast media can generally time-shifted as desired (e.g., time-shifting before the media is broadcast is generally not possible, and additional limitations may be placed on how far broadcast media can be time-shifted), and non-broadcast media can be retrieved and played as appropriate before or after broadcast media. Furthermore, broadcast media can be recorded and played back later, if necessary to accommodate a user configured personalized media channel.

Figure 5:
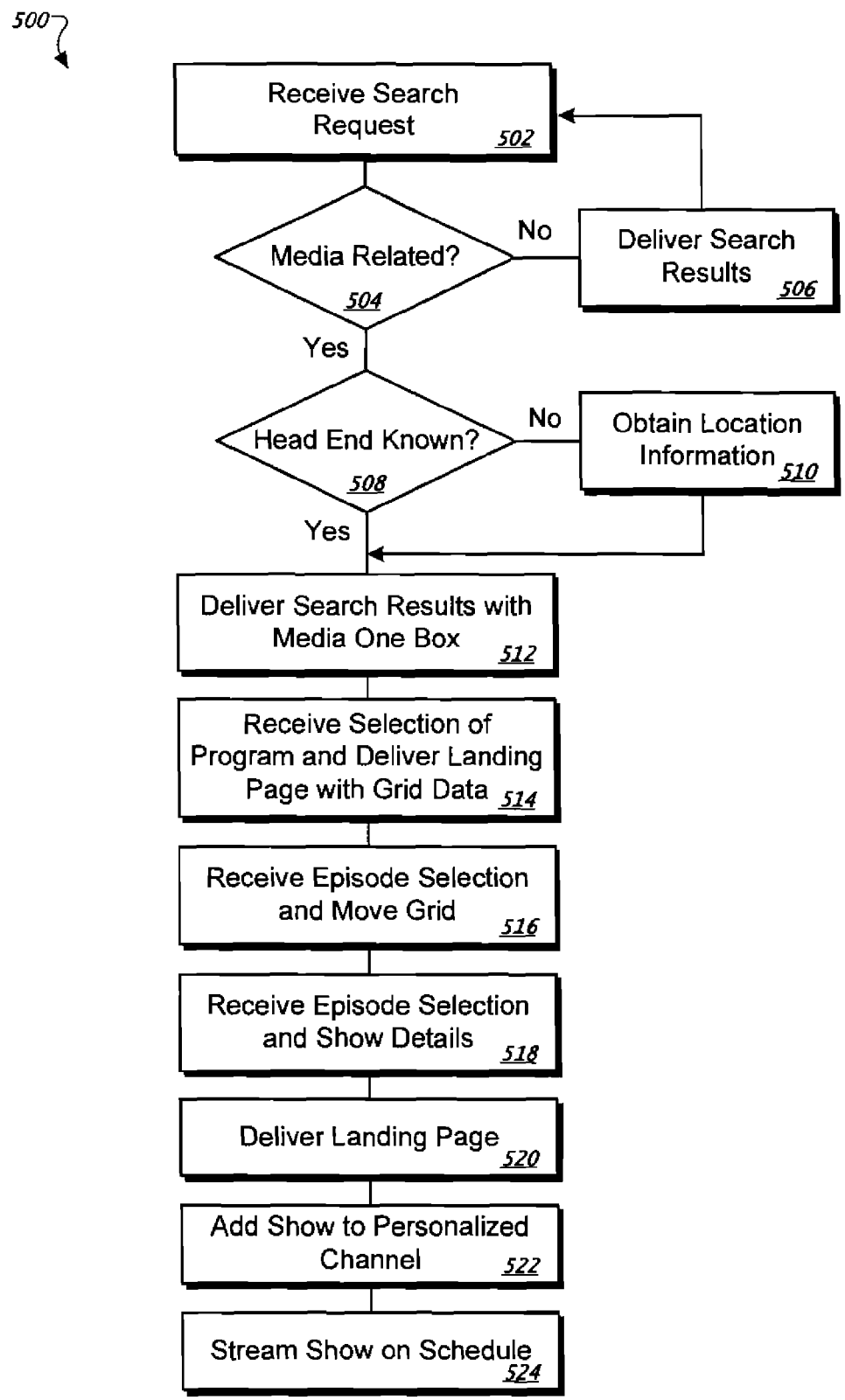
FIG. 5 is a flow chart showing actions performed by a system in providing a user with programming information.

FIG. 5 is a flow chart 500 showing actions performed by a system in providing a user with programming information. In general, the chart 500 shows server-side actions made in response to actions by a user of a client device who is browsing media programming information, such as in the screen shots shown in FIGS. 1 and 1A-D. At box 502, the system receives a search request, which may have been submitted through a search request box for a standard search engine. The system may first determine whether the request is media related (504), such as by comparing terms in the request with terms in a whitelist of media-related terms or concepts. Other similar determinations may be made on the request for similar purposes, e.g., for local search terms, weather-related terms, for shipping information (e.g., UPS and FedEx numbers), etc. If the request is not determined to be media related, basic search results may be delivered back to the user (box 706).

If the request is determined to be media-related, the system may then check to determine whether the user's head end is known, such as by using a cookie or otherwise looking in a system-side database entry associated with the user. If the head end for the user is no known, code for a display like that shown in FIG. 2A may be delivered to the client device of the user, and head end can be determined by obtaining location information for the user (box 510).

Once head end information can be determined, the system may deliver search results to the user with a media One Box, similar to the display in FIG. 1A. After reviewing the results, the user may select a displayed program from the One Box, and the server may receive an indication of such a selection, and may generate code for a landing page like that shown in FIG. 1B. The code may include a list of search results organized in groupings or in some other manner, and code for generating an interactive grid, along with data for generating an initial display of the grid (e.g., around an episode for the top search result) (box 514).

Box 516 shows actions in response to a user's moving of the grid, such as by clicking on a cell and dragging it one way or another. Information about the display area for the grid may be provided to the system, such as by JavaScript running on the client, and a bounding box may be determined for cells displayed in the grid and those around the edge of the display. The relevant cell data may be retrieved and/or generated, and the system may provide additional data, such as in the form of XML data, to the client for filling in new cells in the grid.

Box 518 shows actions in response to a user's selection of a link for a particular episode. In such a situation, the system may deliver mark up code for a details page such as is shown in FIG. 1C. A user may make various selections while on the details page, as described above, and then may select to be returned to the landing page (520). Once back on the landing page, the user may select an episode of a show, such as by dragging a cell into the personalized channel bar, and the system (at the client, and also at the server in certain implementations) may add the episode (and perhaps other episodes of the same program) to the user's personalized channel (box 522).

The server side of the system may keep track of programs in a personalized channel so as to be able to provide programming to the user in a scheduled manner. Thus user's client device may likewise keep track of the schedule and call for the programming at the appropriate time. For example, when a client device is operating and a user selects a channel, such as a personalized channel, that is carrying programming for the current time, the client may make a request for the programming from the server. The server may stream the programming to the client device (box 524), and may be caused to change to different programming, such as if a user chooses to skip a program, or an overlap in programming occurs and another program has a higher priority for the user than does the currently playing program.

Figure 6:
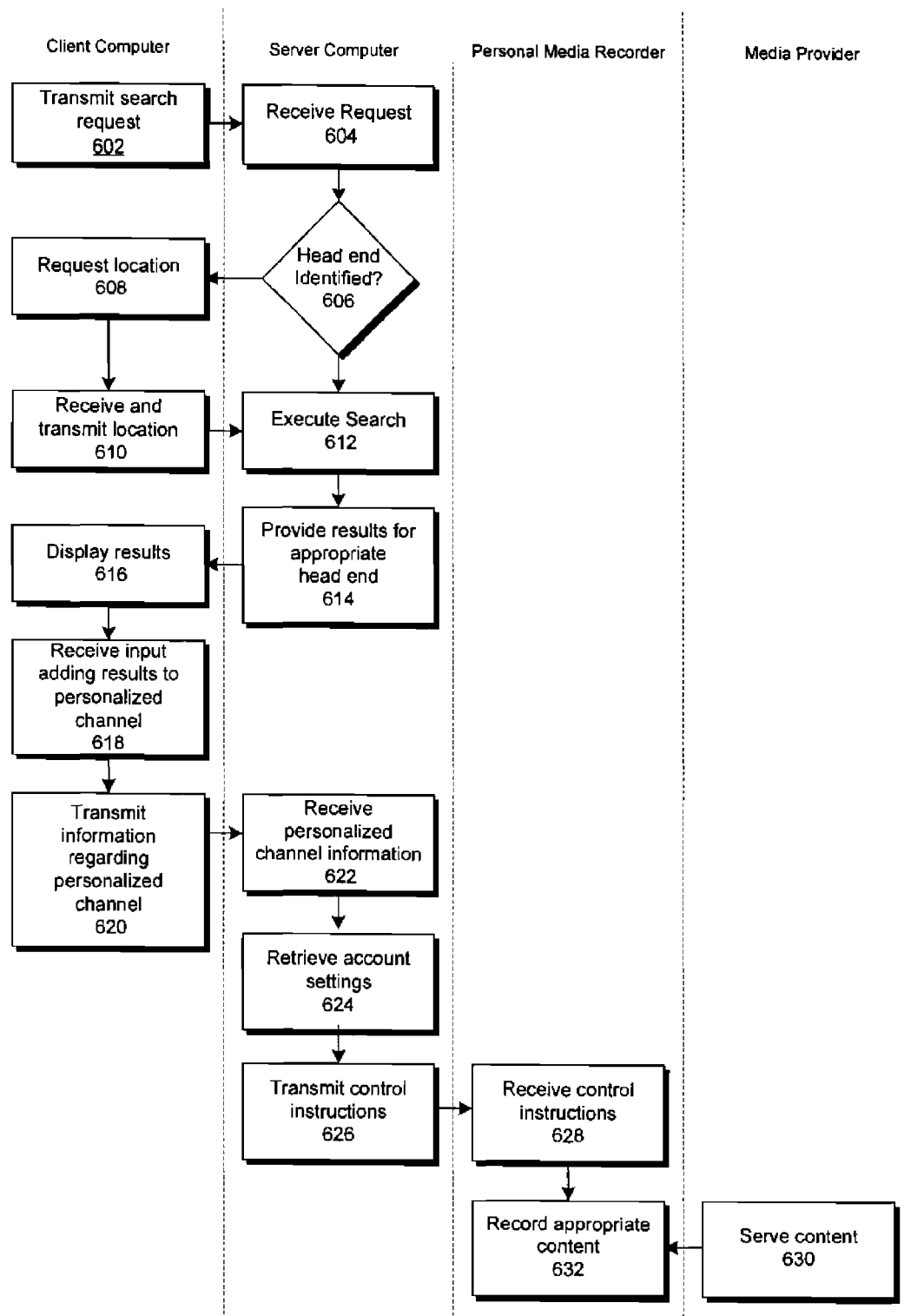
FIG. 6 is a swim lane diagram showing an example of interaction between a client and server for providing programming information, and between the server, a personal media recorder and a media provider in providing specific programming.

FIG. 6 is a swim lane diagram showing an example of interaction between a client and server for providing programming information, and between the server, a personal media recorder and a media provider in providing specific programming. In general, this diagram shows the actions taken by a client and server in an example scenario in which a user employing the client device sets up a personalized media channel, in response to which the personal media recorder captures programming from a media provider according to the content of the personalized media channel. While the example is shown as involving four components, other arrangements of components may also be used and components can be combined and/or eliminated (e.g., the personal computer may implement PVR functionality as part of a media center PC).

At box 602, a client device transmits a search request for media to a server (e.g., Google). The search request could be, for example, a search request for "Lost" sent from a search page, such as the search page 102 that is depicted in FIG. 1A. In some implementations, the search page 102 is associated with a specific user who has logged onto the server computer.

The server can receive the search request (box 604), determine whether the search request relates to media content, and if so, determine (606) whether head end information is identified by the search request. For example, in implementations in which the user is logged into an account on the server, profile information associated with the user may identify a specific head end. The profile information may explicitly reference a head end, or head end information may be implied from other profile information such as address or zip code information. As another example, the search request itself may identify a head end (e.g., "Lost tv show 94086").

If head end information cannot be identified, additional information can be requested. For example, the server can cause a message to be displayed in the client computer that requests location information (box 608). The client computer can receive and transmit (610) additional location information to the server (e.g., city or zip code information, or reference to a specific head end, such as Comcast).

Once head end information is identified by the server—either directly or as a result of additional input received by the client computer, the server can execute (612) a search in response to the search request and based on the identified head end. For example, based on a search request for "lost" and location information that identifies a specific head end (e.g., a head end corresponding to zip code 94086), the server executes a search for "lost," for example on networks provided by the identified head end (e.g., a local cable provider). Results of the search can then be provided (614) to the client device, and displayed (616) there. In particular, for example, results such as those shown in FIG. 1B can be displayed on the client device.

The client device can receive (618) input from a user that causes certain media content to be added to a personalized media channel. The input could be, for example, selection of a specific search result and subsequent selection of an "Add Series to MyTV" command. As another example, the input could be dragging of a box in a schedule grid to an area of a graphical user interface that corresponds to a personalized media channel. For example, Lost could be added to a user's personalized media channel on Apr. 18, 2007, at 9:34 PM.

Subsequently, information regarding the personalized media channel can be transmitted (620) by the client device and received (622) by the server device. In particular, the server device can receive information indicating that the user wishes to add Lost to his or her personalized media channel on Apr. 18, 2007, at 9:34 PM. In some implementations, the server adds this information to a calendar associated with the user, such as is described with reference to FIG. 4A. The server can take additional actions.

In some implementations, the server retrieves (624) other account information associated with the user. In particular, the other account information can include access information for a personal video recorder (PVR) employed by the user. Such information can facilitate control of the PVR by the server computer, as is now described. The server device can assemble control instructions that, when executed, capture programming content that is referenced by a personalized media channel. In the above referenced "Lost" example, and with reference to FIG. 1B, the control instructions can include recording media content available from channel KPIX 5 via the previously identified head end (e.g., a local cable provider) at 10:00 AM, and saving the recorded media content as an episode of "Lost."

The personal media recorder can receive (628) the control instructions and can execute them to record (632) appropriate content. In particular, in some implementations, the personal media recorder is connected to a media provider that continuously serves (630) content. Executing the control instructions can include adjusting a tuner internal to the personal media recorder to an appropriate channel (e.g., KPIX 5) and beginning to record media available on that channel at the prescribed time (e.g., 10 AM). Subsequently, the recorded media can be played back at the user-configured time (e.g., at 9:34 PM on Apr. 18, 2007).

Figure 7:
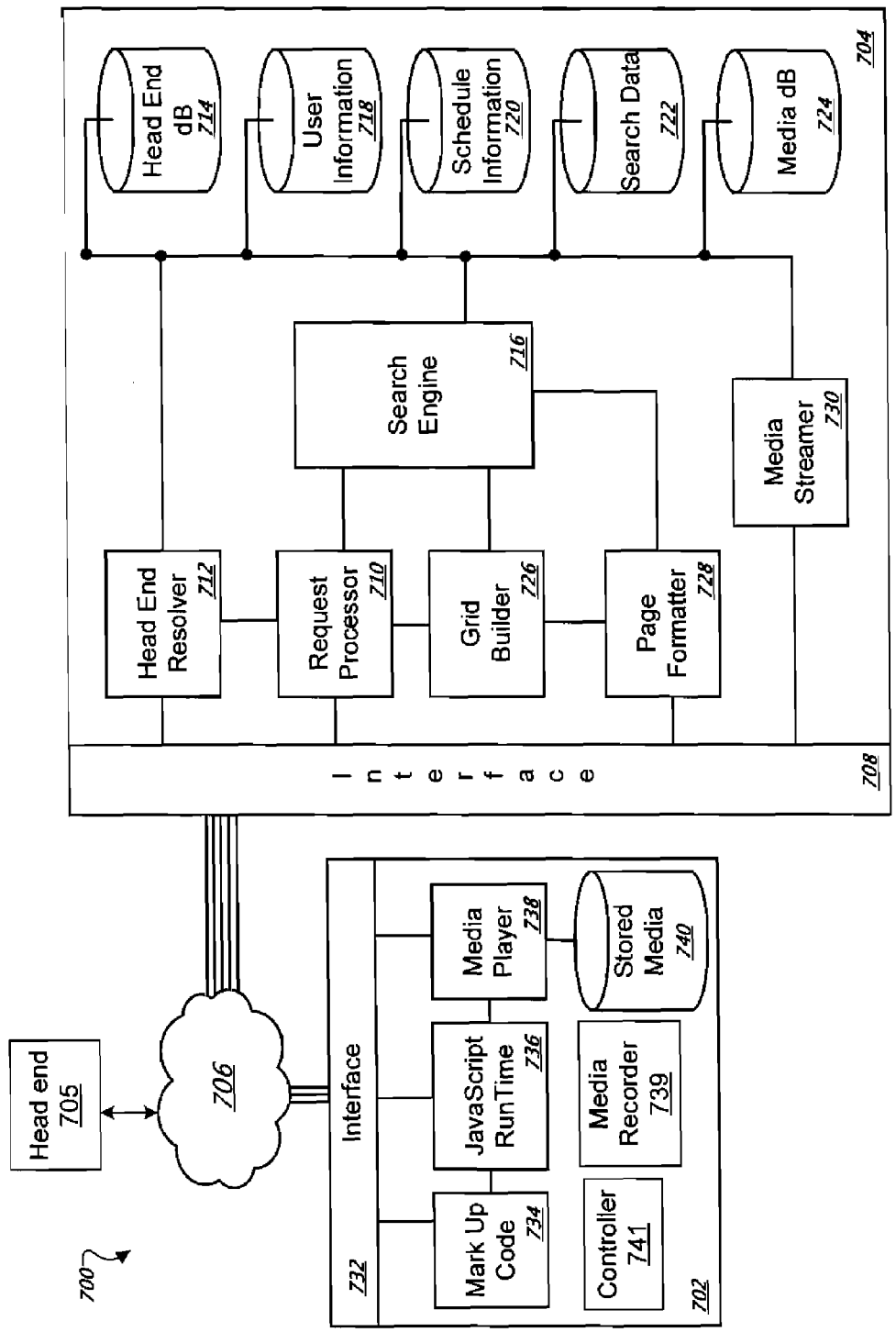
FIG. 7 is a schematic of an example system for accessing media programming.

FIG. 7 is a schematic diagram of an example system 700 for accessing media programming. The system includes a client 702, a server 704, a head end 705, and one or more networks 706 (e.g., the internet and a cable network) connecting the three. The server 704 may communicate through an interface 708, which may itself include one or more web servers. Media-related requests from the client may be identified by the interface and routed to the request processor 710. The request processor may parse the requests into their constituent parts to determine the sort of information requested by the client 702. For example, if the request is a media-related search request, the request processor may pass the search terms to search engine 716, which may return one or more search results in a conventional manner. Also, the search engine 716 may return a media one box, like those described above, where the request is determined to be media related.

Also, if a head end has not been associated with the client 702, a head end resolver 712 may be used to query the user for location information and other information (such as telecom provider) that may help in selecting a head end for the user with information stored in a head end database 714. A head end typically describes a particular source of programming for a user that is unique among various possible sources.

Where a user requests a landing page, grid builder 726 may provide code and generate data for display of a program grid at a particular date and time for a user. The grid builder 726 may receive signals, such as from search engine 716 regarding the position in the grid that is to be displayed on the client 702. Grid information and search information may be provided to a page formatter 728, which may generate code for the display of pages like those shown in FIGS. 1A-1C. The page formatter may also draw on other sources, such as image search results provided by search engine 716, and structured media data stored in media database 724. For example, relationships between and among actors and programs may be stored for display on a details page as shown above.

Various databases may also be accessed by system 700. For example, user information database 718 may contain personalized information about users. Such information may include, for example, favorite channels of the user, the content of the user's personalized channel and other information that may be used to generate custom displays like those shown in FIGS. 1A-C. The data may be accessed, for example, in response to requests form JavaScript running on the client, and may be supplied via XML or other format for use in an asynchronous fashion. Also, schedule information 720 may be provided, such as to grid builder 726 for display of programming information.

Media streamer 730 may be used where streamlining media is provider by the server 704. The media streamer 730 may take any appropriate form and may be triggered based upon a display request from the client 702 when a particular program is set for display on the client 702.

The head end 705 (e.g., a cable service provider) can provide media content directly to the client 702. For example, in some implementations, the head end 705 continuously streams an encrypted stream of media content, and the client 702 is configured to decrypt one or more portions (e.g., channels) of the encrypted stream and provide the decrypted streams to either or both of a media player 738 (e.g., a display screen) or a media recorder 739, which, as shown, is coupled to a media storage device 740 (e.g., a hard drive associated with a DVR or PVR).

In some implementations, the client 702 is programmed to automatically record certain media content provided by the head end 705, for example, in response to a program stored in the client. In particular, a program can be stored in a controller 741, and execution of the program can cause the interface 732 and media recorder 739 to tune to a specific channel at a specific time, according to the stored program, in order to record media content specified by the program.

In some implementations, the client 702 records media in response to commands sent by the server 704. In particular, for example, the server 704 can maintain a personalized channel for a particular user (e.g., in the user information database 718). Based on information in the personalized channel, the page formatter 728 can provide instructions to the client 702 (e.g., via mark-up code or otherwise) that cause the client 702 to record content as described above.

In other implementations, the server 704 obtains media content (e.g., from the head end 705, from another head end (not shown), or from the internal media database 724) in response to a stored program, and the server 704 streams the media content directly to the client 702 at an appropriate time.

In some implementations, the media player 738 in the client device 702 provides media from multiple sources. For example, some media may be live media available from the head end 705 (e.g., live broadcast programming); other media may be stored in the media storage device 740 (e.g., a user-archived movie, or earlier-recorded broadcast programming); still other media may be provided by the media streamer 730 in the server device 704 (e.g., streaming audio, webcast information, advertising, etc.).

Delivery of appropriate content to the media player 738 can be handled in a number of ways. For example, programming information (e.g., a schedule for delivering content in a personalized media channel) can be maintained in the user information database 718, and overall control of the media player 738 can be handled on the server end. As another example, programming information can be maintained in the client 502 (e.g., in the controller 702, in a JavaScript runtime engine 736, or as mark-up code 734 that may be executed by the controller 741). As another example, the media player 738 may be controlled in a distributed manner—for example, sometimes by the head end 705, sometimes by the server 704 and sometimes by the client 702. In implementations in which the media player 738 is controlled in a distributed manner, the controller 741 may maintain a priority scheme for media player 739 instructions that conflict (e.g., instructions from the server 704 may override instructions from the head end 705, and instructions from the client 702 may override instructions from both the head end 705 and the server 704).

FIG. 7 depicts one example arrangement of components in a client device 702, a server device 704 and a head end device 705. Other arrangements are contemplated, and even within the example arrangement, various actions can be executed in different ways. For example, personalized media channel information can be maintained in the controller 741, in the user information 718, in a combination of both, or in some other device. The personalized media channel can be graphically manipulated using mark-up code 734 or JavaScript code that is executed in the runtime engine 736. Alternatively, the personalized media channel can be maintained using another programming code that is directly executed by the controller 741 or by a component of the server 704.

Figure 8:
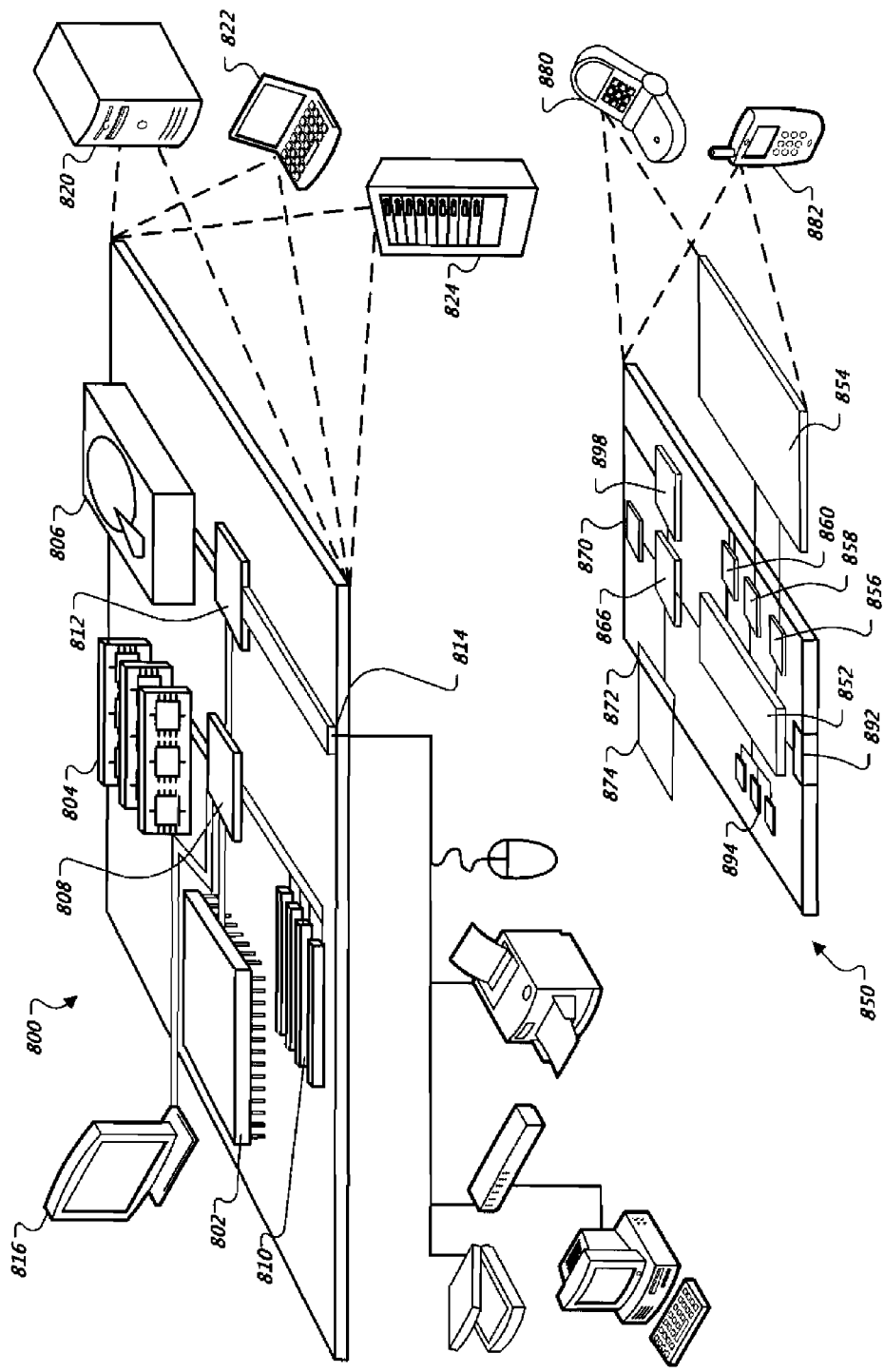
FIG. 8 shows an example of a computer device and a mobile computer device that can be used to implement the techniques described here.

FIG. 8 shows an example of a computer device 800 and a mobile computer device 850 that can be used to implement the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, memory on processor 802, or a propagated signal.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 966, and a transceiver 868, among other components. The device 850 may also be provided with a storage device, such as a microdrive or other device, to provide additional storage. Each of the components 850, 852, 864,854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, memory on processor 852, or a propagated signal that may be received, for example, over transceiver 868 or external interface 862.

Device 850 may communicate wirelessly through communication interface 866, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made. For example, various forms of the flows shown above may be used, with steps re-ordered, added, or removed. Also, although several applications of the disclosed systems and methods have been described, it should be recognized that numerous other applications are contemplated. Accordingly, other embodiments are within the scope of the following claims.

What is claimed is:
1. A computer-implemented method, comprising:
receiving a search request for media programming from a user of a computing device;
obtaining media program information that is responsive to the search request and is generated by identifying media programs that are currently in a personalized channel for the user of the computing device;
displaying adjacent to each other:
(a) a list of media programs from a plurality of different media channels, wherein the displayed list of media programs has the identified media programs that are currently in a personalized channel for the user of the computing device removed from it, and

(b) a multi-dimensional electronic program guide grid that has a time dimension and a channel dimension, that displays one or more media programs from the list of media programs, and wherein the channel dimension includes a personalized channel of media programs selected by or for the user and one or more of the plurality of different media channels;

receiving, from the user, an identification of a media program from among the media programs in the list for inclusion in the personalized channel, and in response, adding the identified media program to the personalized channel at a first time on the time dimension; and adding one or more additional media programs selected by the user from among the media programs in the list to the personalized channel at times other than the first time;

in response to an action by the user, making the personalized channel and the media programs in the personalized channel associated with the user available for viewing by one or more other users by (i) providing the one or more media programs to a personalized media channel maintained by one or more of the other users and (ii) coordinating a viewing of the one or more media programs for the user and one or more of the other users by scheduling, in a calendar application maintained by the one or more other users, the viewing at a time selected by the user.

2. The method of claim 1, wherein receiving the identification of the media program comprises sensing a drag-and-drop command from the list to the personalized channel.

3. The method of claim 1, wherein the one or more additional media programs overlap in time with the identified media program.

4. The method of claim 3, further comprising identifying non-overlapping times for the identified media program and the one or more additional media programs, receiving input including a preferred time of viewing, and moving one or more of the identified media program and the one or more additional media programs to the preferred time of viewing to eliminate the overlap.

5. The method of claim 1, further comprising providing code for causing a display of one or more advertisements targeted to a user or to the identified media program or one or more of the additional media programs.

6. The method of claim 1, further comprising providing code for causing an automatic playing of each of the identified media program and the one or more additional media programs in a predetermined order.

7. The method of claim 6, further comprising identifying advertisements targeted to the identified media program or the one or more additional media programs and providing the advertisements for display between program segments.

8. The method of claim 1, further comprising receiving an input from the user to move the identified media program to a time different than a time at which the identified media program was initially placed in the personalized media channel, and in response, automatically moving the identified media program to the different time.

9. A computer-implemented method, comprising:
receiving a search request for media programming from a first user of a computing device;
obtaining media program information that is responsive to the search request and is generated by identifying media programs that are currently in a personalized channel for the user of the computing device;
displaying adjacent to each other:
(a) a list of media programs from a plurality of different media channels, wherein the displayed list of media programs has the identified media programs that are currently in a personalized channel for the user of the computing device removed from it, and
(b) a multi-dimensional electronic program guide grid that has a time dimension and a channel dimension, that displays one or more media programs from the list of media programs, and wherein the channel dimension includes a personalized channel of media programs selected by or for the first user and one or more of the plurality of different media channels;

receiving, from the first user, a selection of a first program episode from the displayed list of media programs, and in response, moving the electronic program guide so as to display the selected first program episode in the electronic program guide grid;

adding the first program episode to the personalized channel; and in response to an action by the first user, making the personalized channel and the media programs in the personalized channel associated with the first user available for viewing by one or more users other than the first user by (i) providing the one or more media programs to a personalized media channel maintained by one or more of the other users, the one or more media programs provided to the personalized media channel maintained by the one or more other users by transferring copies of the media programs to electronic media viewing devices for the one or more other users, (ii) coordinating a viewing of the one or more media programs for the user and one or more of the other users by scheduling, in a calendar application maintained by the one or more other users, the viewing at a time selected by the user.

10. The method of claim 9, further comprising receiving, from a second user and through a network, a request to add a new second program episode to a network-accessible calendar associated with the first user, and adding the second program episode to the personalized channel of media programs.

11. The method of claim 10, further comprising preventing addition of one or more program episodes to the personalized channel of media programs during one or more corresponding times in which the network-accessible calendar already has an existing appointment scheduled.

12. A computer-implemented system, comprising:
a runtime component to (1) retrieve, in response to receipt of a search request for media programming, media programs that are responsive to the search request and are generated by identifying media programs that are currently in a personalized channel for a user of the computing device; and (2) generate, simultaneously and adjacent to each other, displays of:
(a) a list of media programs from a plurality of different media channels, wherein the displayed list of media programs has the identified media programs that are currently in a personalized channel of the user of the computing device removed from it, and
(b) a multi-dimensional electronic program guide grid that has a time dimension and a channel dimension, that displays one or more media programs from the list of media programs, and wherein the channel dimension includes a personalized channel of media programs selected by or for a first user and one or more of the plurality of different media channels; and
a media store, associated with the first user, holding one or more recorded media programs from the plurality of different media channels;

a media player controller programmed to arrange the recorded media programs and one or more transmitted media programs from the plurality of different media channels on the personalized channel to permit automated and continuous playback of the recorded media programs and the transmitted media programs;

a media recorder under control of the media player controller to store the recorded media programs in the media store for later playback on the personalized channel; and an internet-connected interface to, in response to an action by the first user, make the personalized channel and the recorded media programs in the personalized channel available for viewing by one or more users other than the first user by, (i) providing the one or more recorded media programs to a personalized media channel maintained by one or more of the other users and (ii) coordinating a viewing of the one or more media programs for the user and the one or more other users by scheduling, in a calendar application maintained by the one or more other users, the viewing at a time selected by the user.

13. The system of claim 12, wherein the internet-connected interface is further configured to receive streaming media, and wherein the media player controller is further programmed to play the streaming media.

14. The system of claim 13, wherein the internet-connected interface is further configured to receive advertisements targeted to the first user or the recorded media programs and the transmitted media programs on the personalized channel and to provide the advertisements for display under control of the media player controller.

* * * * *